United States Patent
Kitada et al.

(10) Patent No.: US 9,154,390 B2
(45) Date of Patent: Oct. 6, 2015

(54) PACKET RELAY APPARATUS AND MEASUREMENT METHOD FOR MEASURING DISCARD NUMBER OF DATA PACKETS

(71) Applicant: FUJITSU LIMITED, Kawasaki-shi (JP)

(72) Inventors: Atsushi Kitada, Kawasaki (JP); Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 13/685,223

(22) Filed: Nov. 26, 2012

(65) Prior Publication Data
US 2013/0229925 A1 Sep. 5, 2013

(30) Foreign Application Priority Data
Mar. 6, 2012 (JP) .................................. 2012-049205

(51) Int. Cl.
*H04L 12/26* (2006.01)

(52) U.S. Cl.
CPC ............ *H04L 43/08* (2013.01); *H04L 43/0847* (2013.01)

(58) Field of Classification Search
CPC ............................. H04L 43/08; H04L 43/0847
USPC .......................... 370/241–244, 246, 250, 252
See application file for complete search history.

(56) References Cited

U.S. PATENT DOCUMENTS

| | | | |
|---|---|---|---|
| 6,798,742 B1 * | 9/2004 | Mawhinney et al. | ......... 370/230 |
| 7,551,612 B2 | 6/2009 | Kobayashi | |
| 7,738,465 B2 | 6/2010 | Akahane et al. | |
| 2005/0094572 A1 * | 5/2005 | Mimura et al. | ............... 370/252 |
| 2006/0218271 A1 * | 9/2006 | Kasslin et al. | ............... 709/224 |
| 2007/0223385 A1 * | 9/2007 | Berly et al. | .................... 370/250 |

(Continued)

FOREIGN PATENT DOCUMENTS

| | | |
|---|---|---|
| JP | 08-214002 | 8/1996 |
| JP | 2004-320458 | 11/2004 |

(Continued)

OTHER PUBLICATIONS

JPOA—Office Action of Japanese Patent Application No. 2012-049205 dated Aug. 18, 2015, with English Translation of the Office Action.  US20070223385 cited in the JPOA was previously cited by the Examiner on Sep. 29, 2014.  JP2005-210756 cited in the JPOA was submitted in the IDS filed on Nov. 26, 2012, and consider by the Examiner on Sep. 23, 2014.

*Primary Examiner* — Paul H Masur
(74) *Attorney, Agent, or Firm* — Fujitsu Patent Center

(57) ABSTRACT

A packet relay apparatus includes a first packet processing circuit and a second packet processing circuit. The first packet processing circuit executes, discarding data packets from among data packets, and transferring the rest of the data packets to the second packet processing circuit, counting discard number of the data packets, determining whether or not the discard number is equal to or greater than a threshold and transferring, if the discard number is equal to or greater than the threshold, a discard number information packet including discard number information indicating the discard number to the second packet processing circuit. The second packet processing circuit executes discarding data packets from among the data packets, counting discard number of the data packets and collecting the discard number counted by the second packet processing circuit and the discard number indicated by the discard number information included in the discard number information packet.

9 Claims, 25 Drawing Sheets

(56) References Cited

U.S. PATENT DOCUMENTS

2008/0259814 A1* 10/2008 Lin ............................. 370/252
2009/0010194 A1* 1/2009 Seok et al. .................. 370/312
2009/0011715 A1* 1/2009 Seok et al. ................ 455/67.11
2009/0252035 A1 10/2009 Fukunaga et al.
2011/0176554 A1 7/2011 Yamada et al.

FOREIGN PATENT DOCUMENTS

| | | |
|---|---|---|
| JP | 2005-51736 | 2/2005 |
| JP | 2005-210756 | 8/2005 |
| JP | 2009-253768 | 10/2009 |
| JP | 2010-213239 | 9/2010 |
| JP | 2011-151601 | 8/2011 |

* cited by examiner

FIG.7

| FID | DISCARD NUMBER |
|---|---|
| 1 | 0 |
| 2 | 1 |
| 3 | 5 |
| 4 | 10 |
| ⋮ | ⋮ |
| N | 3 |

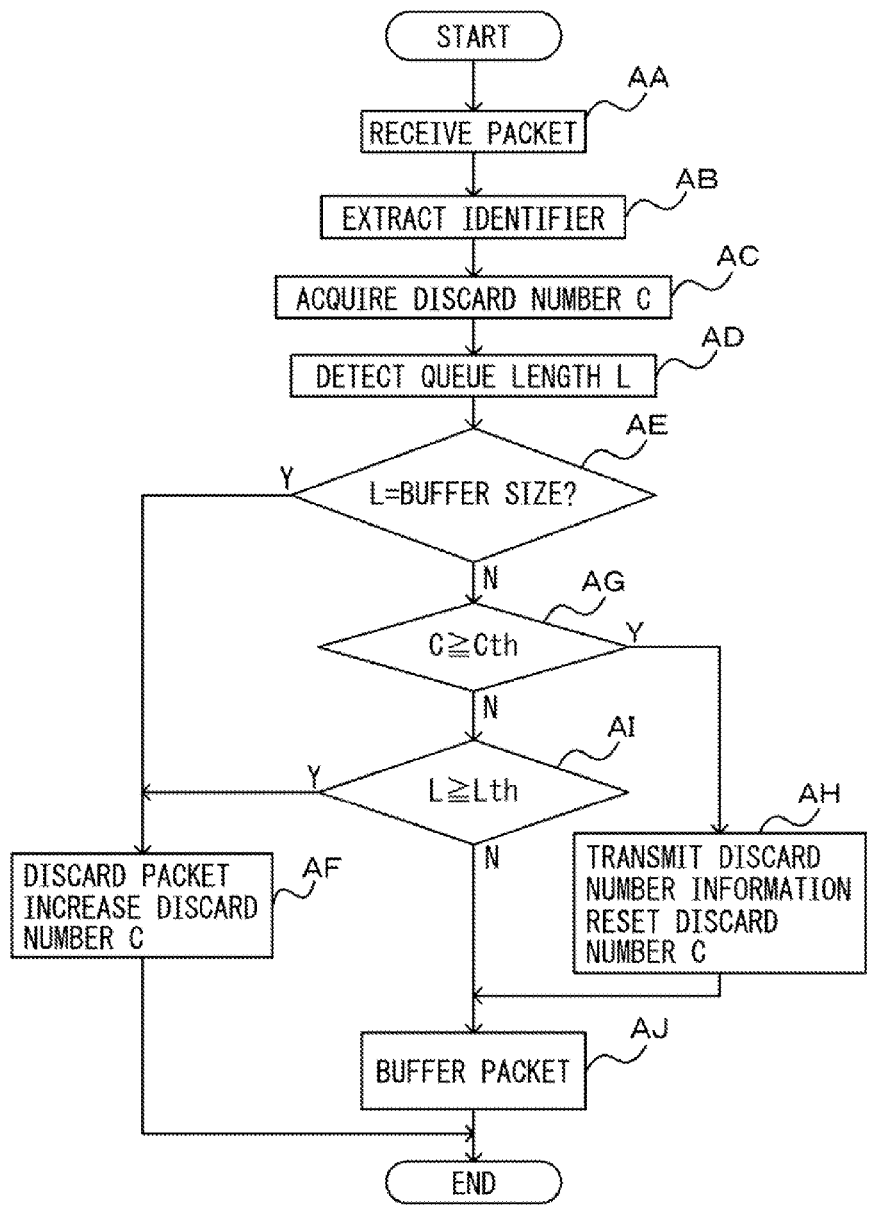

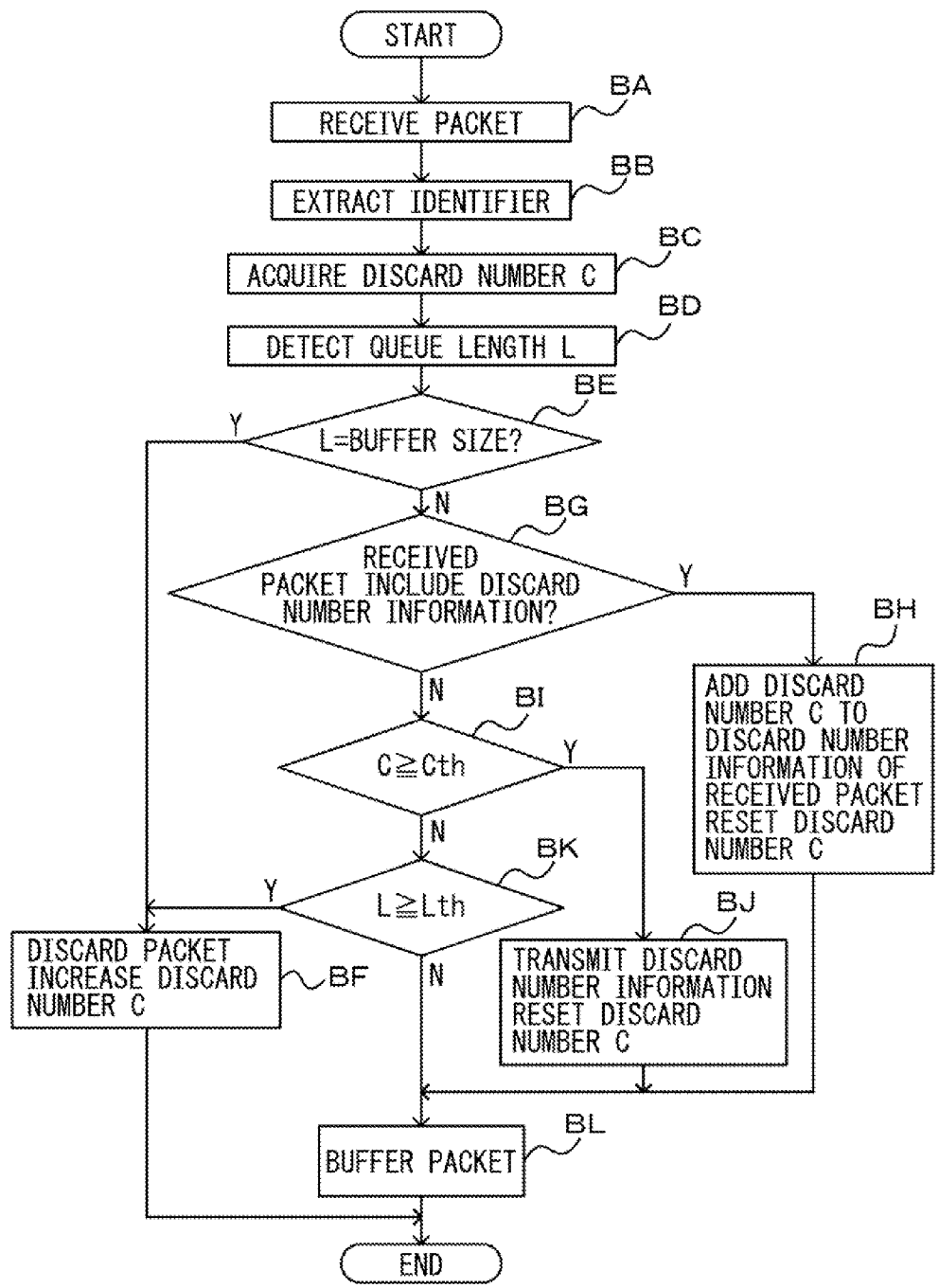

FIG.13

| FID | DISCARD NUMBER |
|---|---|
| 1 | 0 |
| 2 | 1 |
| 3 | 0 |
| 4 | 3 |

| FID | DISCARD NUMBER | COLLECTION FLAG |
|---|---|---|
| 1 | 0 | 1 |
| 2 | 1 | 0 |
| 3 | 5 | 1 |
| 4 | 10 | 0 |
| ⋮ | ⋮ | ⋮ |
| N | 3 | 0 |

FIG.23A

| MID | BITMAP |
|---|---|
| 1 | 11000······1 |
| ⋮ | ⋮ |

←—64 DIGIT—→

FIG.23B

| MID | START FID |
|---|---|
| 1 | 3 |
| ⋮ | ⋮ |

FIG.23C

| FID | NEXT FID | END FLAG |
|---|---|---|
| ⋮ | ⋮ | ⋮ |
| 3 | 4 | 0 |
| 4 | 5 | 1 |
| ⋮ | ⋮ | ⋮ |

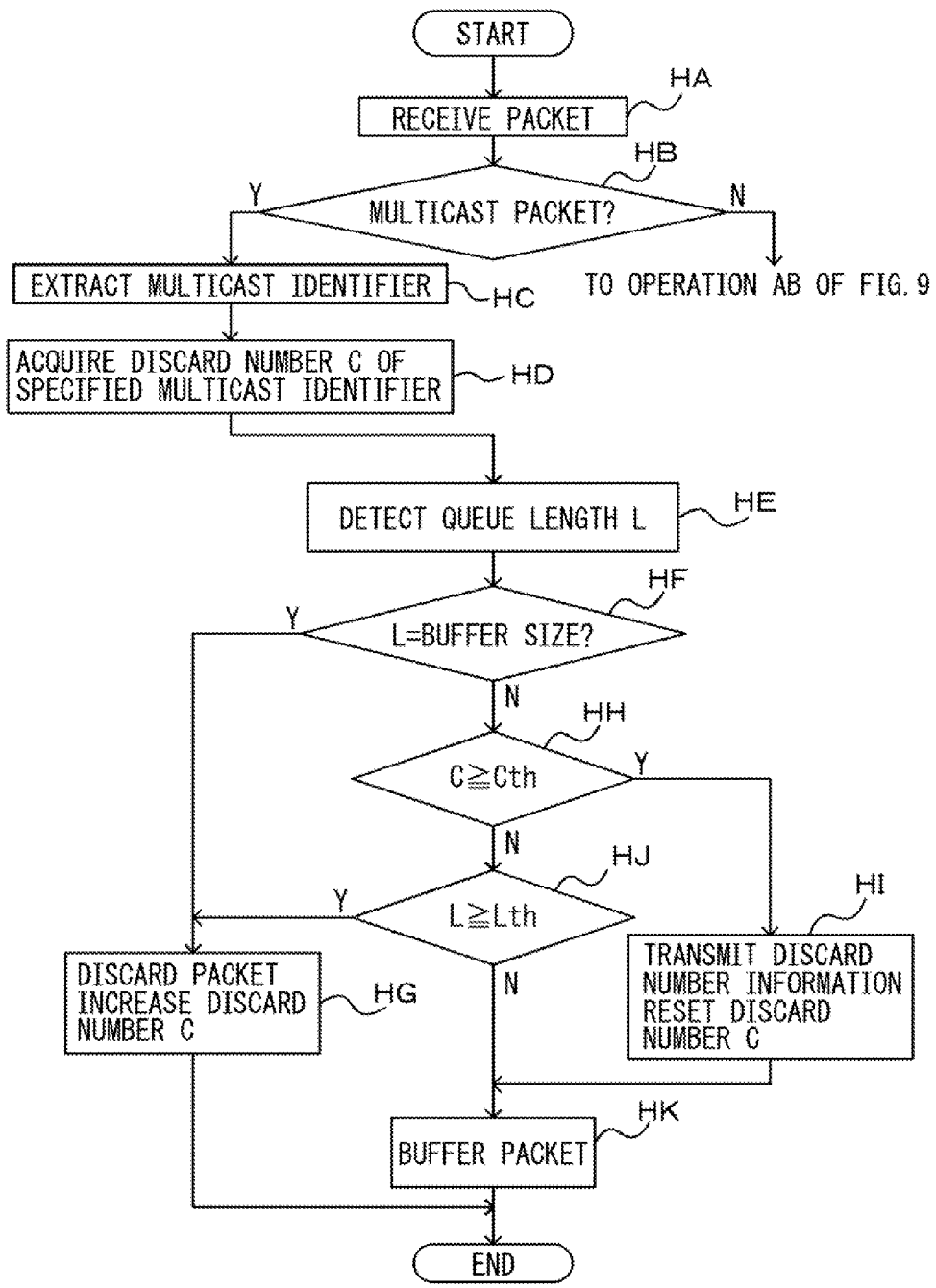

FIG.27A

| MID | DISCARD NUMBER |
|-----|----------------|
| 1   | 200 → 0        |
| ⋮   | ⋮              |

FIG.27B

| MID | DISCARD NUMBER |
|-----|----------------|
| 1   | 100 → 0        |
| ⋮   | ⋮              |

FIG.27C

| MID | DISCARD NUMBER |
|-----|----------------|
| 1   | 50 → 0         |
| ⋮   | ⋮              |

FIG.27D

| FID | DISCARD NUMBER |
|-----|----------------|
| ⋮   | ⋮              |
| 3   | c1 → c1+350    |
| 4   | c2 → c2+350    |
| 5   | c3 → c3+350    |
| ⋮   | ⋮              |

PACKET RELAY APPARATUS AND MEASUREMENT METHOD FOR MEASURING DISCARD NUMBER OF DATA PACKETS

CROSS-REFERENCE TO RELATED APPLICATIONS

This application is based upon and claims the benefit of priority of the prior Japanese Patent Application No. 2012-049205, filed on Mar. 6, 2012, the entire contents of which are incorporated herein by reference.

FIELD

Embodiments described in the present specification relate to measurement of a number of discarded data packets.

BACKGROUND

In order to monitor communication quality of packet communication, a number of discarded data packets is collected in a packet apparatus. For example, a packet may be provided with a discard counter in each buffer in which packets may be discarded, and a processor provided in the packet apparatus may use software processing to sequentially inquire each discard counter and collects number of discarded packets counted in each discard counter.

Related art is disclosed in Japanese National Publication of International Patent Applications No. 2005-51736, 2005-210756, 2010-213239, 2004-320458 and 8-214002.

SUMMARY

In accordance with an aspect of the apparatus, there is provided a packet relay apparatus. The packet relay apparatus includes a first packet processing circuit and a second packet processing circuit. The first packet processing circuit executes discarding of some data packets and transferring the rest of the data packets to the second packet processing circuit, counting discard number of discarded data packets, determining whether or not the discard number is equal to or greater than a threshold, and if the discard number is equal to or greater than the threshold, transferring a discard number information packet containing discard number information indicating the discard number to the second packet processing circuit. The second packet processing circuit executes discarding of some data packets, counting discard number of discarded data packets, and collecting the discard number counted by the second packet processing circuit and the discard number indicated by the discard information included in the discard number information packet.

In accordance with an aspect of the method, there is provided a measurement method for measuring a discard number of data packets discarded by a packet relay apparatus that includes a first packet processing circuit and a second packet processing circuit. The measurement method causes the first packet processing circuit to execute discarding of some data packets and transferring the rest of the data packets, counting the discard number of discarded data packets, determining whether or not the discard number is equal to or greater than a threshold, and if the discard number is equal to or greater than a threshold, transferring a discard number information packet including discard number information indicating the discard number to the second packet processing circuit in the same path as the data packet transfer path. The measurement method causes the second packet processing circuit to execute discarding of some data packets, counting the discard number of discarded data packets, and collecting the discard number counted by the second packet processing circuit and the discard number indicated by the discard number information included in the discard number information packet.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 7 is a view depicting a first example of the discard number table.

FIG. 9 is a view for illustrating a first example of the operation of the discard control unit.

FIG. 10 is a view for illustrating a second example of the operation of the discard control unit.

FIG. 13 is a view depicting an example of values in the discard number table.

FIG. 23A is a view for illustrating the packet replicating operation by the packet replication unit.

FIG. 23B is a view for illustrating the packet replicating operation by the packet replication unit.

FIG. 23C is a view for illustrating the packet replicating operation by the packet replication unit.

FIG. 26 is a view for illustrating a fifth example of the operation of the discard control unit.

FIG. 27A is a view for illustrating variation of the values in the discard number table.

FIG. 27B is a view for illustrating variation of the values in the discard number table.

FIG. 27C is a view for illustrating variation of the values in the discard number table.

FIG. 27D is a view for illustrating variation of the values in the discard number table.

DESCRIPTION OF EMBODIMENTS

When each discard counter is sequentially inquired by software processing, collection period for collecting discard number becomes longer than when the discard number is collected by hardware processing. If a packet apparatus uses counters each of which allows a larger discard number to be counted in order not to produce overflow in case of relatively long collection period, size of used memory would be increased.

In order to shorten the collection period, it is possible to assist the collection of the discard number with hardware processing. For example, the packet apparatus may send out a control packet for collecting discard number counted by each counter from the ingress side on the same path as the transmission path of data packet. When the control packet passes through each buffer on the transmission path, the packet apparatus accumulates the discard number counted by the discard counter in each buffer to the discard number stored in the control packet. When the control packet arrives at the buffer at the final stage, the packet apparatus adds the discard number accumulated in the control packet to the discard number counted by the discard counter in the final stage. As a result, packet discard number is summed up in the discard number in the final stage, so that number of counters inquired for discard number decreases and collection period is shortened.

However, since a control packet flows through the transmission path, transmission frequency band for data packet may be narrowed. It is the object of the apparatus and method disclosed herein to reduce narrowing of transmission frequency band for data packet due to the control packet for collecting packet discard number counted by discard counters flowing in the transmission path of data packet.

<1. Hardware Construction>
<1.1. Packet Apparatus>

Figure 1:
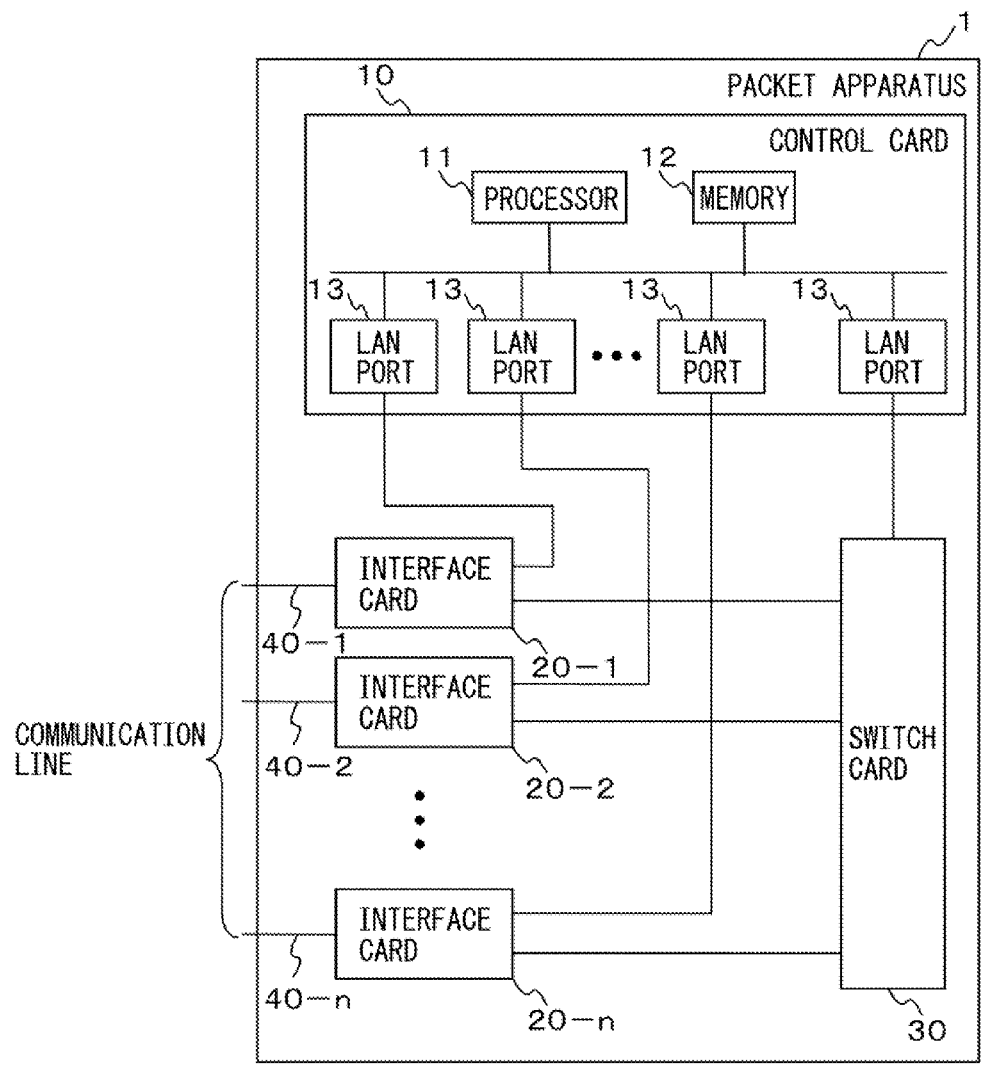
FIG. 1 is a view depicting an exemplary hardware construction of a packet apparatus.

Preferred embodiments will be described with reference to appended drawings. FIG. 1 depicts an exemplary hardware construction of a packet apparatus. The packet apparatus 1 includes a control card 10, interface cards 20-1 to 20-n and a switch card 30. In the description that follows, the interface cards 20-1 to 20-n may be collectively denoted as "interface card 20". The hardware construction depicted in FIG. 1 is only an exemplary hardware construction realizing a packet apparatus 1. Any other hardware construction may be adopted as long as operations described below in the present specification can be performed.

The control card 10 controls operations of the entire packet apparatus 1, and control information for these operations are exchanged to and from the interface cards 20-1 to 20-n and a switch card 30. The control card 10 includes a processor 11, a memory 12, and LAN (local area network) ports 13, . . . , 13. The processor 11 executes computer programs stored in the memory 12 to thereby execute control of the packet apparatus 1, reception of command inputted from a user, and information processing for execution of the command, etc. Also, the processor 11 executes information processing for exchanging control information with the interface cards 20-1 to 20-n and a switch card 30. Control information exchanged with the interface cards 20-1 to 20-n and a switch card 30 is inputted and outputted via LAN port 13, . . . , 13 connected to the processor 11.

The memory 12 may include a non-volatile storage device for storing programs and data used for execution thereof. The non-volatile storage device may be, for example, a flash memory, a hard disc, or a ROM (Read Only Memory). The memory 12 may include a RAM (Random Access Memory) for storing data used during the operation of the processor 11.

<1.2. Interface Card 20>

Next, interface card 20 will be described. Interface cards 20-1 to 20-n perform input/output operation of packet data carrying user data via respective communication lines 40-1 to 40-n. In the description that follows, the communication lines 40-1 to 40-n may be collectively denoted as "communication line 40".

Figure 2:
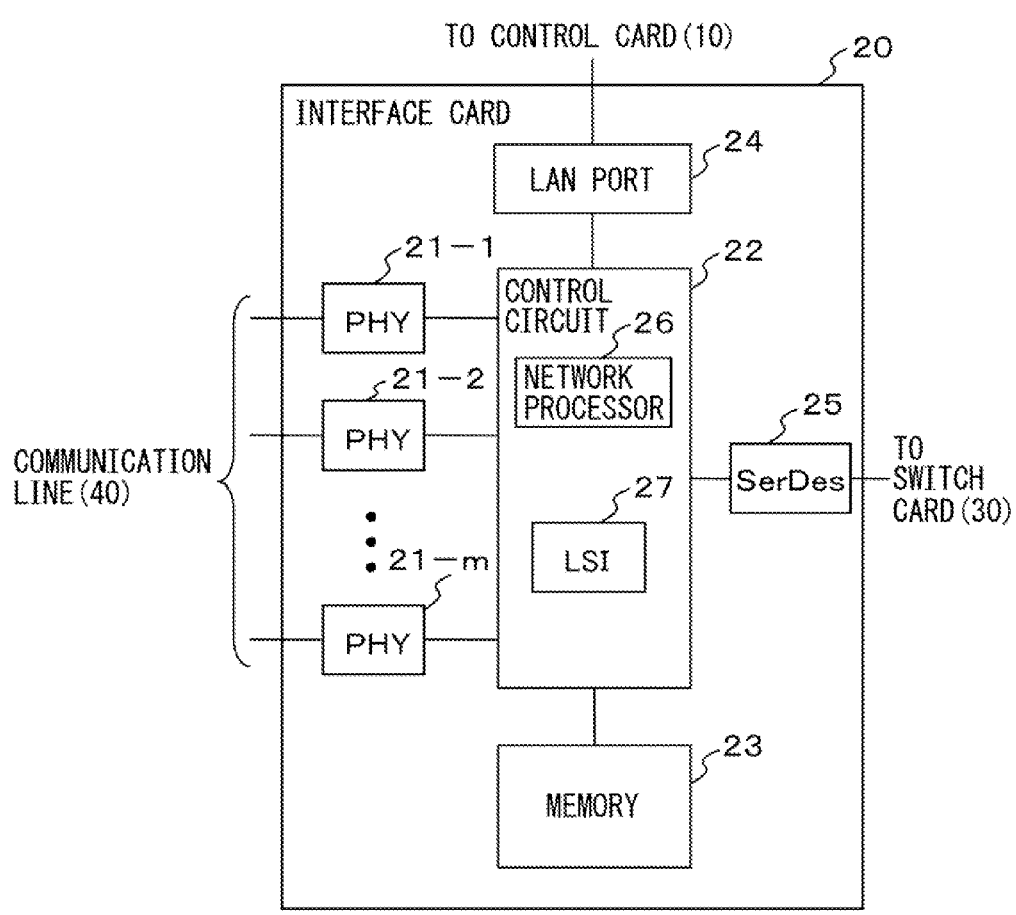
FIG. 2 is a view depicting an exemplary hardware construction of an interface card.

FIG. 2 is a view depicting an exemplary hardware construction of the interface card 20. The interface card 20 includes transmission/reception circuits 21-1 to 21-m, a control circuit 22, a memory 23, a LAN port 24 and a serializer/deserializer 25. In the appended drawings and description that follows, a transmission/reception circuit and a serializer/deserializer 25 are respectively denoted as "PHY" and "SerDes". In the description that follows, PHY 21-1 to 21-m may be collectively denoted as PHY 21. The hardware construction depicted in FIG. 2 is only an example of hardware construction realizing the interface card 20. Any other hardware construction may be adopted as long as the operation described below in the present specification can be executed.

PHY 21 executes termination processing in physical layer by performing optical/electrical conversion, signal level translation and code conversion of signal transmitted/received via communication line 40. The control circuit 22 executes priority control, frequency band control and buffering control, packet discard control, and collection of statistics information such as packet discard number information, of packets inputted and outputted by the interface card 20. The control circuit 22 includes a LSI (Large Scale Integration) 27, and the above-described operations of the control circuit 22 are executed by the LSI 27. LSI 27 may be, for example, FPGA (Field Programming Gate Array) or ASIC (Application Specific Integrated Circuit), etc. In place of or in addition to FPGA or ASIC, the control circuit 22 may include a network processor 26. The network processor 26 may execute a part or all of the operations of the control circuit 22.

In the memory 23, a queue for buffering the packet inputted or outputted by the interface card 20 is stored. If the control circuit 22 includes a network processor 26, the computer program to be executed by the network processor 26 and data used for the execution are stored in the memory 23. The memory 23 may include a non-volatile storage device for storing the computer program and data used for execution thereof. Also, the memory 23 may include RAM for storing data and queue used at the time of operation of LSI 27 or the network processor 26. LAN port 24 outputs or inputs control signal to and from the processor 11 of the control card 10. SerDes 25 performs parallel-serial conversion of packet data transmitted to the switch card 30, and serial-parallel conversion of packet data received from the switch card 30.

<1.3. Switch Card 30>

Figure 3:
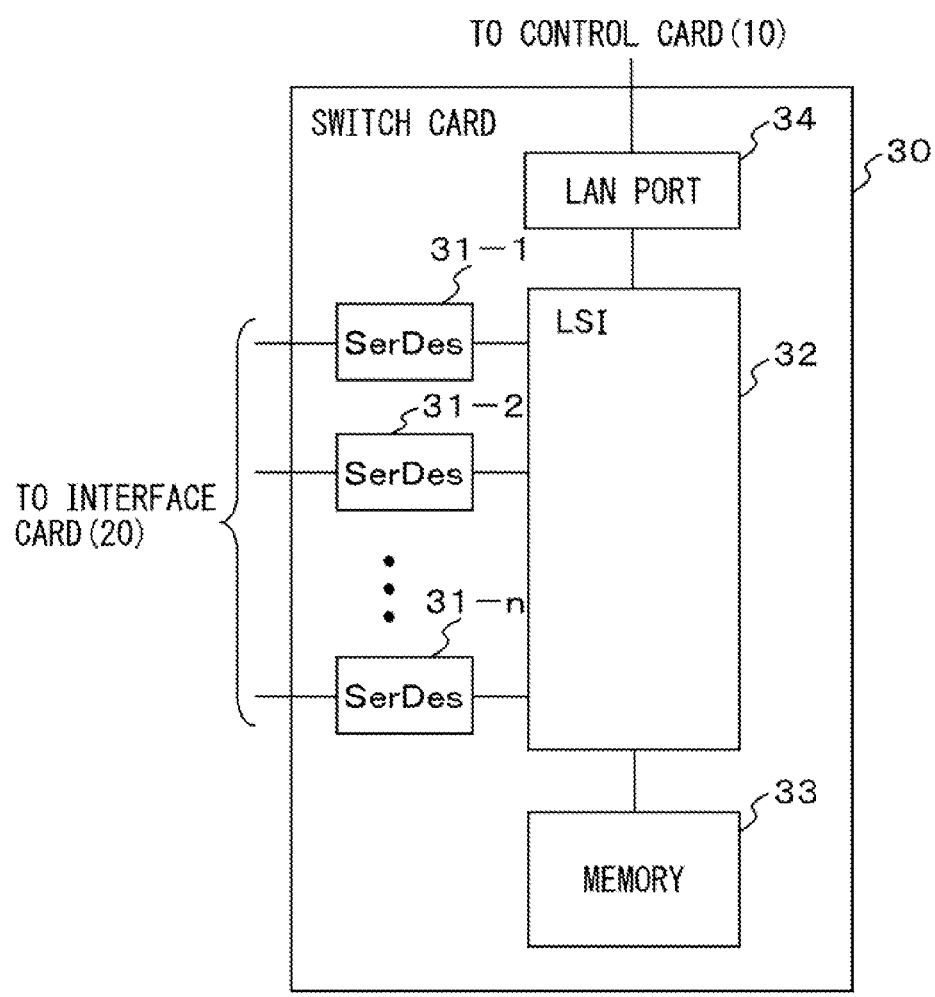
FIG. 3 is a view depicting an exemplary hardware construction of a switch card.

Next, the switch card 30 will be described. The switch card 30 distinguishes destination of packet data received from the interface card 20, and outputs the packet to the interface card in accordance with the destination. FIG. 3 is a view depicting the hardware construction of the switch card 30. The switch card 30 includes SerDes 31-1 to 31-n, a LSI 32, a memory 33, and a LAN port 34. The hardware construction depicted in FIG. 3 is only an example of the hardware construction for realizing the switch card 30. Any other hardware construction may be adopted as long as the operation described below in the present specification can be executed.

SerDes 31-1 to 31-n performs serial/parallel conversion of the packet data received from the interface card 20-1 to 20-n. SerDes 31-1 to 31-n performs parallel/serial conversion of the packet data outputted to the interface card 20-1 to 20-n. LSI 32 performs switching of packet received from the interface card 20, discarding of packets, and collection of statistics information.

The queue for buffering packets to be switched by the switch card 30 is stored in the memory 33. The memory 33 may include RAM for storing the queue and data used in the operation of LSI 32. LAN port 34 outputs and inputs the control signal to and from the processor 11 of the control card 10.

<2. Packet Discarding Site>

Figure 4:
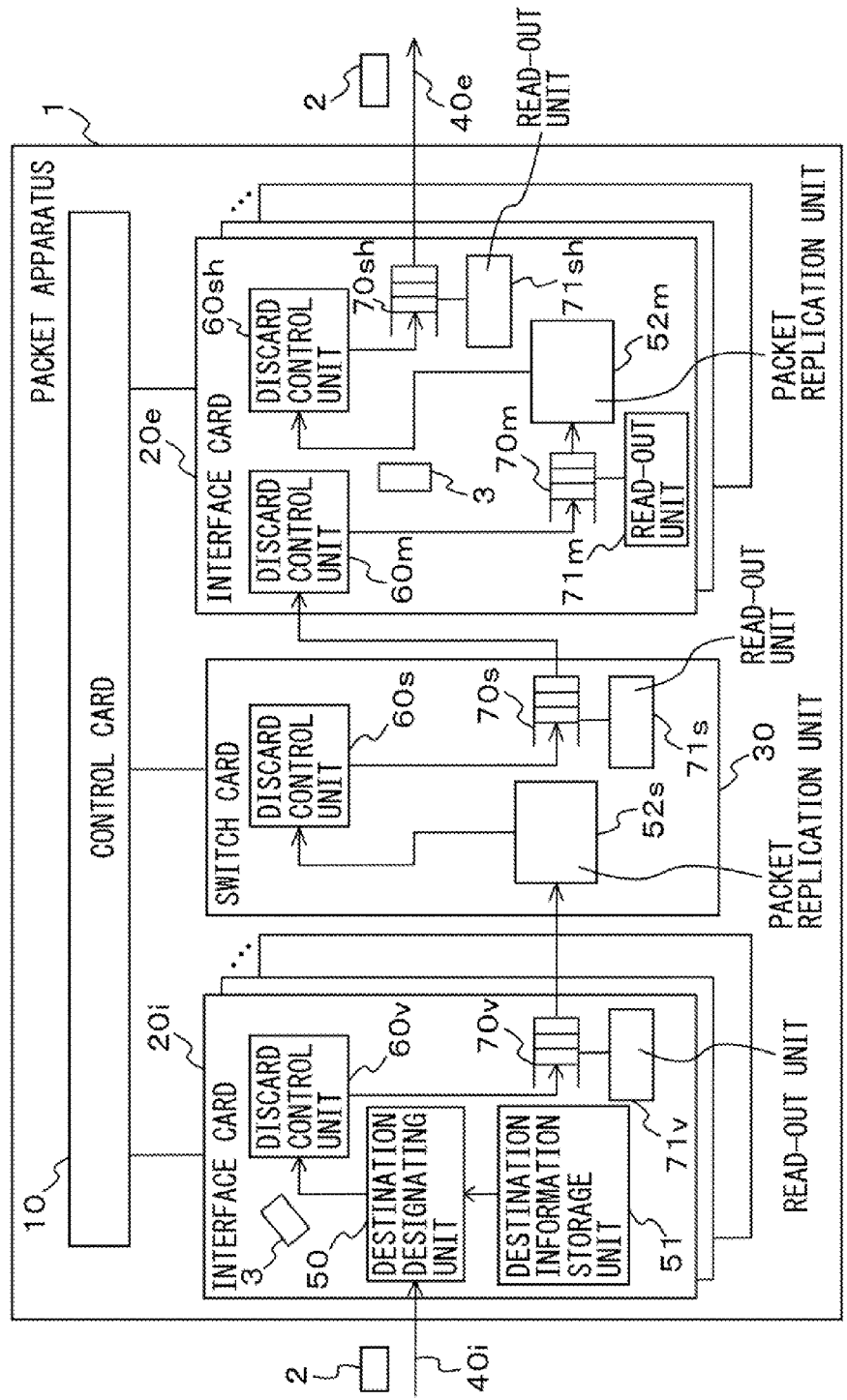
FIG. 4 is a view for illustrating an example of packet discarding site in the packet apparatus.

Next, discarding of packets and collection of packet discard number information in the packet apparatus 1 will be described. FIG. 4 is a view for illustrating an example of packet discarding site in the packet apparatus 1. Reference numeral 2 denotes the packet being focused. Reference numerals 20$i$ and 20$e$ denote the cards on the ingress side and egress side of the interface cards 20 for inputting and outputting the focused data packet 2. Reference numerals 40$i$ and 40$e$ denote the communication line on the ingress side and egress side of the communication line 40 for inputting and outputting the focused data packet 2.

The interface card 20$i$ on the ingress side and the switch card 30 include a virtual output queue 70$v$ and a switch queue 70$s$, respectively, and read-out units 71$v$ and 71$s$ for reading out packets accumulated in respective queues. The interface card 20$e$ on the egress side includes a multicast queue 70$m$ and shaper queue 70$sh$, and read-out units 71$m$ and 71$sh$ for reading out packets accumulated in respective queues.

The virtual output queue 70$v$ is a buffer for accumulating packets waiting for output from the interface card 20$i$ to the switch card 30, and is stored in the memory 23 depicted in FIG. 2. The switch queue 70$s$ is a buffer for accumulating packets waiting for output from the switch card 30 to the interface card 20$e$, and is stored in the memory 33 depicted in FIG. 3.

The multicast queue 70$m$ is used for accumulating multicast packets waiting for packet copy processing. The shaper queue 70$sh$ is a buffer for accumulating output packets having frequency band limited due to shaping. The multicast queue 70$m$ and the shaper queue 70$sh$ are stored in the memory 23 depicted in FIG. 2.

The interface card 20$i$ includes a discard control unit 60$v$ that discards packets arriving at the virtual output queue 70$v$. The interface card 20$i$ discards a packet if, for example, the queue length of the virtual output queue 70$v$, i.e., the amount occupied by the packets in the queue, exceeds a threshold.

The switch card 30 includes a discard control unit 60$s$ for discarding packets arriving at the switch queue 70$s$.

The interface card 20$e$ includes a discard control unit 60$m$ and a discard control unit 60$sh$ for discarding packets arriving at the multicast queue 70$m$ and the shaper queue 70$sh$. In the description that follows, the discard control units 60$v$, 60$s$, 60$m$ and 60$sh$ may be collectively denoted as "discard control unit 60". Also, the virtual output queue 70$v$, the switch queue 70$s$, the multicast queue 70$m$ and the shaper queue 70$sh$ may be collectively denoted as "queue 70".

When a data packet 2 is inputted to the interface card 20$i$, the destination designating unit 50 identifies the flow to which the data packet 2 belongs. For example, the destination designating unit 50 detects the flow identifier ID accommodated in the header of the data packet 2. The flow identifier ID is the identifier of the flow to which the data packet 2 belongs.

In the destination information storage unit 51, information relating to the interface card 20$e$ on the egress side of the destination of each flow is stored. The destination designating unit 50 refers to the destination information storage unit 51 and specifies the interface card 20$e$ of the destination of data packet 2 stored in relation to the flow identifier FID. The destination designating unit 50 outputs a packet with the in-device header added to the data packet 2. The in-device header includes designator of the destination interface card 20$e$. In the description that follows, a packet with the in-device header added thereto may be denoted as "in-device packet".

Figure 5:
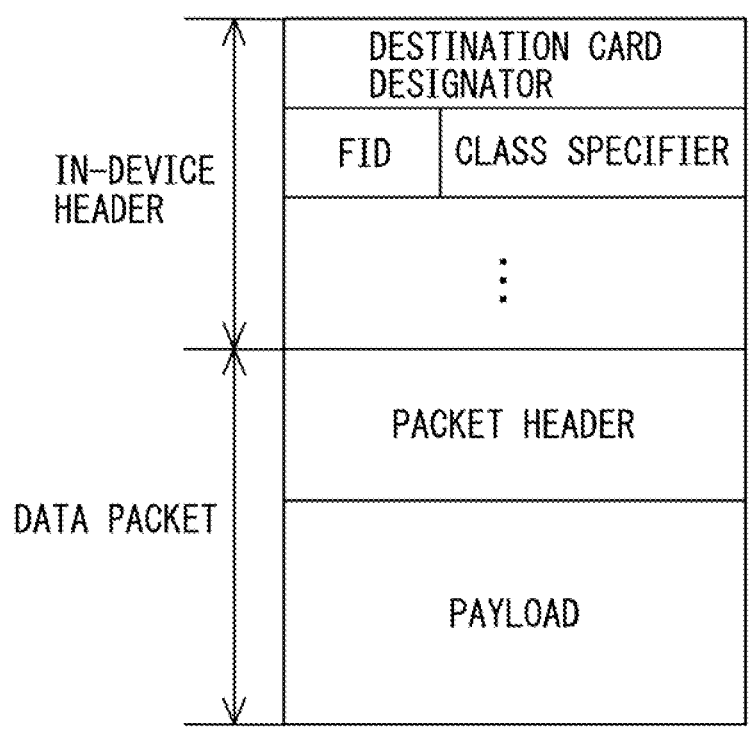
FIG. 5 is a view depicting a first example of format of an in-device packet transferred within the apparatus.

FIG. 5 is a view depicting an exemplary format of an in-device packet 3 transferred in the packet apparatus. The in-device packet 3 includes data packet main body and an in-device header added thereto. The data packet 2 includes the packet header and payload. For example, the in-device header may include a destination card designator, a flow identifier FID, and a class specifier. The destination card designator designates a destination interface card 20$e$ of a data packet. The class specifies the class to which the in-device packet 3 is classified in the packet apparatus 1. The format depicted in FIG. 10 is only an example, and other in-device packet 3 may have other format.

Referring to FIG. 4, the destination designating unit 50 outputs the in-device packet 3 to the discard control unit 60$v$. The discard control unit 60$v$ determines whether or not the received in-device packet 3 is to be accumulated in the virtual output queue 70$v$. The discard control unit 60$v$ stores the in-device packet 3 determined to be accumulated in the virtual output queue 70$v$, and discards the rest of the packets in the apparatus 3. The discard control unit 60$v$ counts discard number of the discarded packets. The read-out unit 71$v$ reads out the in-device packet 3 accumulated in the virtual output queue 70$v$ and outputs it to the packet replication unit 52$s$ of the switch card 30.

If the data packet 2 carried by the in-device packet 3 is a multicast packet, the packet replication unit 52$s$ replicates the in-device packet 3, and provides the packets in the apparatus 3 in number corresponding to the number of interface cards 20$e$ on the egress side of flow. The packet replication unit 52$s$ outputs the packets in the apparatus 3 to the discard control unit 60$s$. In <3. First exemplary embodiment> to <6. Fourth exemplary embodiment> below, discard processing and collection of discard number information relating to unicast packets will be described, and in <7. Fifth exemplary embodiment>, discard processing and collection of discard number information relating to multicast packets will be described.

The discard control unit 60$s$ determines whether or not the received in-device packet 3 is to be accumulated in the switch queue 70$s$. The discard control unit 60$s$ stores the in-device packet 3 determined to be accumulated in the switch queue 70s, and discards the rest of the packets in the apparatus 3. The discard control unit 60s counts discard number of the discarded packets in the apparatus. The read-out unit 71s reads out the in-device packet 3 accumulated in the switch queue 70s and outputs it to the discard control unit 60m of the interface card 20e.

The in-device packet 3 outputted from the switch queue 70s is inputted to the discard control unit 60m of the interface card 20e. The discard control unit 60m determines whether or not the received in-device packet 3 is to be accumulated in the multicast queue 70m. The discard control unit 60m stores the in-device packet 3 determined to be accumulated in the multicast queue 70m, and discards the rest of the packets in the apparatus 3. The discard control unit 60m counts discard number of discarded packets. The read-out unit 71m reads out the in-device packet 3 accumulated in the multicast queue 70m and outputs it to the packet replication unit 52m.

If a data packet 2 carried by the in-device packet 3 is a multicast packet, the packet replication unit 52m replicates the in-device packet 3, and provides packets in the apparatus 3 in number of unicast flow branching by destinations of the multicast packet. The packet replication unit 52m outputs the in-device packet 3 to the discard control unit 60sh.

The discard control unit 60sh determines whether or not the received in-device packet 3 is to be accumulated in the shaper queue 70sh. The discard control unit 60sh stores the data packet 2 included in the in-device packet 3 determined to be accumulated in the shaper queue 70sh, and discards the rest of the packets in the apparatus 3. The discard control unit 60sh counts discard number of discarded packets. The read-out unit 71sh reads out the data packet 2 accumulated in the shaper queue 70sh, and outputs it to the communication line 40e.

The above-described operations of the destination designating unit 50, the discard control unit 60v, 60m and 60sh, the packet replication unit 52m, and the read-out unit 71v, 71m, and 71sh are executed by LSI 27 depicted in FIG. 2. In other exemplary embodiments, a part or all of these operations may be executed by the network processor 26 depicted in FIG. 2. Storage region for the destination information storage unit 51 is provided in the memory 23 depicted in FIG. 2. The above-described operations of the discard control unit 60s, the packet replication unit 52s, and the read-out unit 71s are executed by LSI 27 depicted in FIG. 32.

<3. First Exemplary Embodiment>
<3.1. Exemplary Functional Construction of Discard Control Unit 60v>

Figure 6:
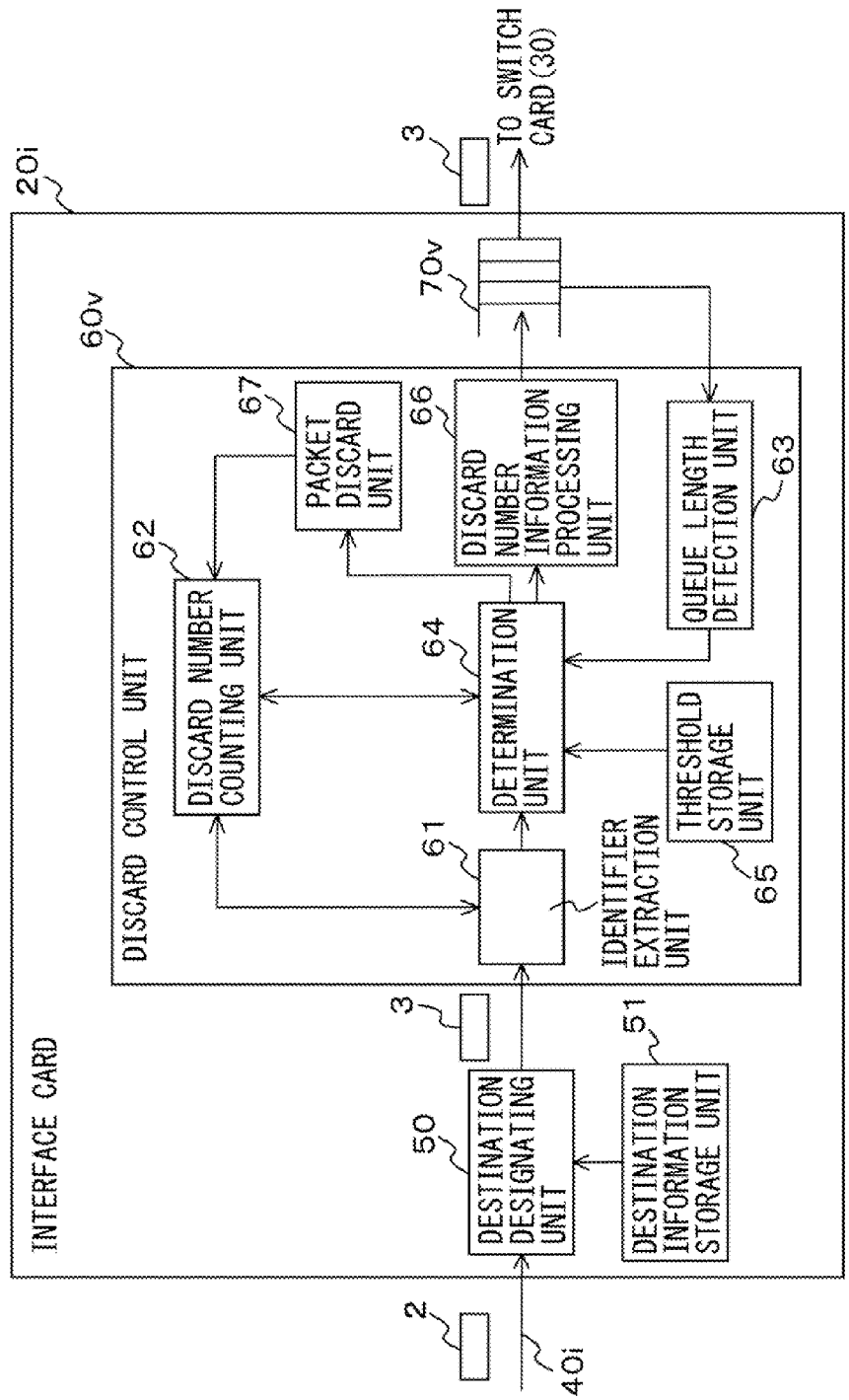
FIG. 6 is a functional block diagram of a first example of the discard control unit.

Next, an exemplary embodiment of the discard control unit 60 will be described below. FIG. 6 is a functional block diagram depicting a first example of the discard control unit 60v. The discard control unit 60v includes an identifier extraction unit 61, a discard number counting unit 62, a queue length detection unit 63, a determination unit 64, a threshold storage unit 65, a discard number information processing unit 66, and a packet discard unit 67. FIG. 6 depicts mainly those functions relating to the description that follows. The discard control unit 60v may include constituents other than those constituents depicted in the drawing. The discard control unit 60s and 60m may have same construction as the control unit 60v. The same applies to any functional block diagram of other exemplary embodiment of the discard control unit 60v.

The identifier extraction unit 61 extracts a flow identifier FID for identifying the flow of the data packet 2 from the in-device header of the in-device packet 3 arriving at the virtual output queue 70v. The identifier extraction unit 61 acquires discard number C of packets belonging to the flow with this flow identifier FID from the discard number counting unit 62. The discard number counting unit 62 maintains a discard number table for storing the discard number indicating, by flow, number of packets discarded by the discard control unit 60v in respective flows.

Figure 7:
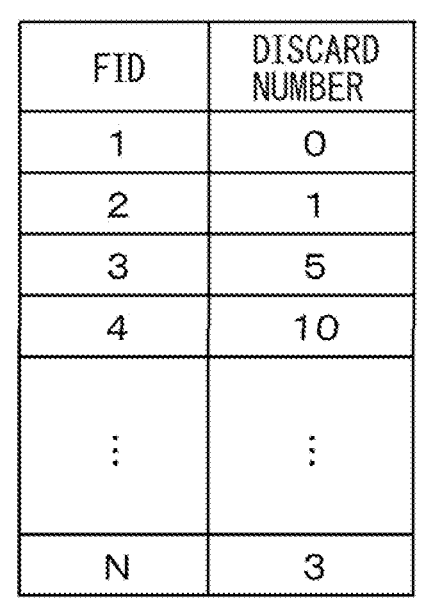

FIG. 7 depicts a first example of the discard number table. The discard number table has information elements "FID" and "discard number". The information element "FID" indicates the flow identifier of the flow transmitted/received by the packet apparatus 1. The information element "discard number" indicates the discard number of discarded packets belonging to the flow of respective flow identifier FID. In the example of FIG. 7, the discard numbers of discarded packets belonging to the flow with flow identifier FID of "1", "2", "3", "4", . . . "N" are, respectively, "0", "1", "5", "10", . . . "3".

Referring to FIG. 6, the identifier extraction unit 61 outputs the discard number C acquired from the discard number counting unit 62 to the determination unit 64. The queue length detection unit 63 monitors the queue length L of the virtual output queue 70v, and outputs the queue length information of the virtual output queue 70v to the determination unit 64. The determination unit 64 acquires the discard number notification threshold Cth and the priority queue length threshold Lth stored in the threshold storage unit 65.

The determination unit 64 determines whether or not the queue length L is equal to the buffer size of the virtual output queue 70v, i.e., maximum data amount that can be accumulated in the virtual output queue 70v. If the queue length L is equal to the buffer size of the virtual output queue 70v, the determination unit 64 determines that the packets are to be discarded.

If the queue length L is less than the buffer size of the virtual output queue 70v, the determination unit 64 determines whether or not the discard number C is equal to or greater than the discard number notification threshold Cth. If the discard number C is equal to or greater than the discard number notification threshold Cth, the determination unit 64 determines that the discard number information indicating the discard number C is to be accommodated in a packet and sent out to the switch card 30 in the next stage. In this case, the determination unit 64 outputs the discard number information to the discard number information processing unit 66, and resets the packet discard number C of the flow identifier FID stored in the discard number table.

If the determination unit 64 determines that the discard number information is to be sent out, the discard number information processing unit 66 accommodates the discard number information in a packet transmitted on the data stream of main signal on which the in-device packet 3 is transmitted. The packet accommodating the discard number information is denoted as "discard number information packet". The discard number information processing unit 66 stores the discard number information packet in the virtual output queue 70v. The packet stored in the virtual output queue 70v is read out by the read-out unit 71 depicted in FIG. 4, and is outputted to the switch card 30 in the next stage.

Figure 8A:
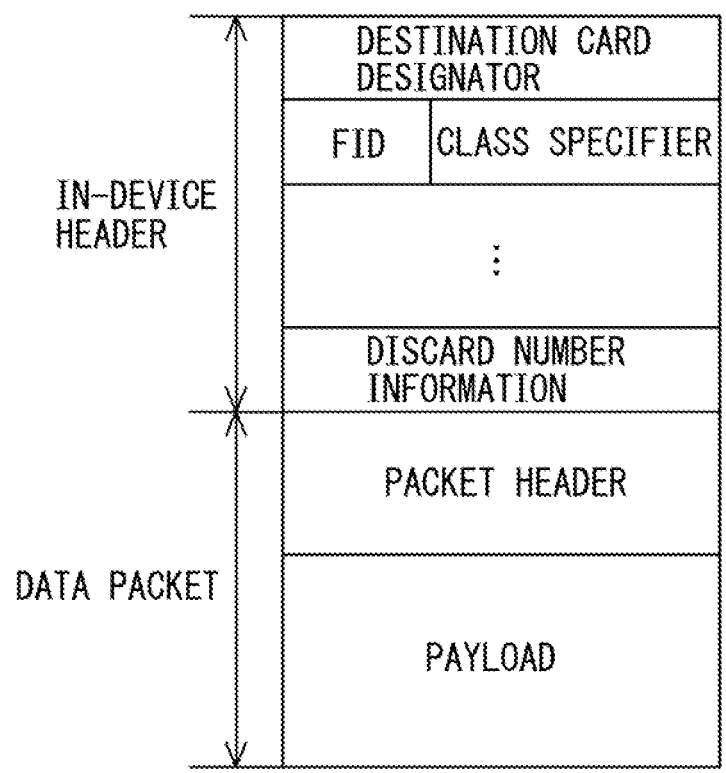
FIG. 8A is a view depicting a first example of format of the discard number information packet.
Figure 8B:
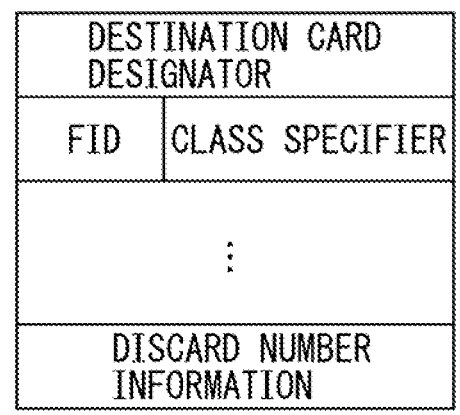
FIG. 8B is a view depicting a second example of format of the discard number information packet.

FIGS. 8A and 8B are views depicting a first example and a second example of format of the discard number information packet. Content of the information elements "destination card designator" and "FID" and "class specifier" included in the discard number information packet is the same as the example of FIG. 5. The flow identifier FID identifies which flow of discard number is the flow of the discard number stored in the discard number information packet.

The discard number information packet of FIG. 8A has an option field in the in-device header added to the data packet 2, and the discard number information is accommodated in the option field. The discard number information processing unit 66 accommodates the discard number information in the in-device header of an incoming in-device packet 3.

The example of the discard number information packet of FIG. 8B depicts a control packet newly generated for transmission of the discard number information separate from the in-device packet including data packet. The discard number information processing unit 66 replicates the in-device header of an incoming in-device packet 3, and accommodates the discard number information in the in-device header to thereby generate the control packet of FIG. 8B.

The discard number information packets of FIG. 8A and FIG. 8B have the same in-device header as the in-device packet 3 incoming to the virtual output queue 70v, so that they are transmitted in the same transmission path as the flow to which the data packet 2 carried by the in-device packet 3 belongs. Therefore, the discard number information of the data packet 2 of a flow is transferred to the discard control units 60s, 60m, and 60sh counting the discard number of data packet 2 of this flow.

Referring to FIG. 6, if it is not determined that the discard number information is to be sent out, the determination unit 64 next determines whether or not the queue length L is equal to or greater than the priority queue length threshold Lth. If the queue length L is equal to or greater than the priority queue length threshold Lth, the determination unit 64 determines that the in-device packet is to be discarded. In the case where the in-device packet is to be discarded, the determination unit 64 outputs the incoming in-device packet 3 to the packet discard unit 67. The packet discard unit 67 discards this in-device packet 3, and increases the value of the discard number C stored in the discard number table for the flow to which the in-device packet 3 belongs by one. In the case where the in-device packet 3 is not discarded, the determination unit 64 stores the in-device packet 3 into the virtual output queue 70v.

The above-described operations of the identifier extraction unit 61, the discard number counting unit 62, the queue length detection unit 63, the determination unit 64, the discard number information processing unit 66 are executed by LSI 27 depicted in FIG. 2. In other exemplary embodiments, a part or all of these operations may be executed by the network processor 26 depicted in FIG. 2. Storage region for the discard number counting unit 62 to maintain the discard number table, and storage region for the threshold storage unit 65 are provided in the memory 23 depicted in FIG. 2.

<3.2. Operation of the Discard Control Unit 60v>

Next, operation of the discard control unit 60v will be described. FIG. 9 is a view for illustrating a first example of the operation of the discard control unit 60v. A series of operations illustrated below with reference to FIG. 9 may be construed as a method including a plurality of steps. In this case, "operation" may be replaced by "step". This applies also to the case of FIG. 10, FIG. 12, FIG. 16, FIG. 17, FIG. 19, FIG. 21, and FIG. 26.

In operation AA, the discard control unit 60v receives a in-device packet 3 incoming to the virtual output queue 70v. In operation AB, the identifier extraction unit 61 extracts the flow identifier FID identifying the flow of the data packet 2 from the in-device header of the in-device packet 3. In operation AC, the identifier extraction unit 61 acquires the discard number C of discarded packets belonging to the flow of the flow identifier FID from the discard number counting unit 62. The identifier extraction unit 61 outputs the discard number C acquired from the discard number counting unit 62 to the determination unit 64.

In operation AD, the queue length detection unit 63 detects the queue length L of the virtual output queue 70v, and outputs the queue length information to the determination unit 64. In operation AE, the determination unit 64 determines whether or not the queue length L is equal to the buffer size of the virtual output queue 70v. If the queue length L is equal to the buffer size of the virtual output queue 70v (operation AE: Y), the processing proceeds to operation AF. If the queue length L is less than the buffer size of the virtual output queue 70v (operation AE: N), the processing proceeds to operation AG.

In operation AF, the determination unit 64 outputs the in-device packet 3 to the packet discard unit 67. The packet discard unit 67 discards the in-device packet 3, and increase the value of the discard number C stored in the discard number table for the flow identifier FID by one, and thereafter the processing is terminated.

In operation AG, the determination unit 64 determined whether or not the discard number C is equal to or greater than the discard number notification threshold Cth. If the discard number C is equal to or greater than the discard number notification threshold Cth (operation AG: Y), the processing proceeds to operation AH. If the discard number C is less than the discard number notification threshold Cth (operation AG: N), the processing proceeds to operation AI.

In operation AH, the discard number information processing unit 66 stores the discard number information packet indicating the discard number C into the virtual output queue 70v. The discard number information packet is outputted by the read-out unit 71 to the switch card 30 in the next stage. The determination unit 64 resets the packet discard number C for the flow with flow identifier FID stored in the discard number table. Thereafter, the processing proceeds to operation AJ.

In operation AI, the determination unit 64 determines whether or not the queue length L is equal to or greater than the priority queue length threshold Lth. If the queue length L is equal to or greater than the priority queue length threshold Lth (operation AI: Y), the processing proceeds to operation AF. The in-device packet is discarded. If the queue length L is less than the priority queue length threshold Lth (operation AI: N), the processing proceeds to operation AJ. In operation AJ, the determination unit 64 stores the in-device packet into the virtual output queue 70v. The in-device packet 3 is outputted by the read-out unit 71 to the switch card 30 in the next stage.

As can be seen from the above description, as far as the queue length L is less than the buffer size of the virtual output queue 70v, even if the queue length L is equal to or greater than the priority queue length threshold Lth, the discard number information packet is stored in the virtual output queue 70v. On the other hand, packets except the discard number information packet are discarded if the queue length L is equal to or greater than the priority queue length threshold Lth. In this manner, the discard number information packet is buffered in the virtual output queue 70v in preference to other packets, and is transmitted to the circuit in subsequent stage. Therefore, even when traffic is congested, the discard number information packet is easily sent to subsequent stage.

<3.3. Operation of the Discard Control Units 60s and 60m>

Next, operation of the discard control units 60s and 60m will be described below. Operation of the discard control unit 60s and the discard control unit 60m are similar to the operation of the discard control unit 60v, and difference between them will be described below.

The discard control unit 60s may receive discard number information packet transmitted by the discard control unit 60v in the previous stage. The discard control unit 60*m* may receive discard number information packet transmitted by the discard control unit 60*v* or 60*s* in the previous stage. Similarly, the discard control unit 60*sh* may receive discard number information packet transmitted by the discard control unit 60*v*, 60*s*, or 60*m* in the previous stage. On the other hand, as has been described above in <3.1. Exemplary functional construction of the discard control unit 60*v*>, the discard number information packet including discard number information of a flow is transmitted in the same path as the data packet 2 of same flow. Therefore, the discard control unit 60*s*, 60*m*, and 60*sh* performs discard processing of the data packet 2 of the same flow as the flow for which the discard number information included in the received discard number information packet is counted, and has the discard number information relating to the flow.

When the discard number information packet including the discard number information relating to a flow is received, the discard number information processing unit 66 of the discard control unit 60*s* adds the discard number C counted for the data packet of this flow to the discard number indicated by the discard number information of the discard number information packet. The discard number information processing unit 66 stores the discard number information packet having the discard number information added thereto in the switch queue 70*s*. The discard number information packet is transferred to the discard control unit 60*m* by the read-out unit 71*s*. The discard control unit 60*m* similarly performs addition of the discard number information of the discard number information packet and transfer of the discard number information packet.

FIG. 10 is a view for illustrating an example of operation of the discard control unit 60*s*. The processing in operations BA to BF is the same as the processing in operations AA to AF. In operation BG, the determination unit 64 determines whether or not the received in-device packet 3 is a discard number information packet. If the in-device packet 3 is a discard number information packet (operation BG: Y), the processing proceeds to operation BH. If the in-device packet 3 is not a discard number information packet (operation BG: N), the processing proceeds to operation BI.

In operation BH, the determination unit 64 outputs the discard number information indicating the discard number C of packets belonging to the flow of the flow identifier FID included in the discard number information packet to the discard number information processing unit 66. Also, the determination unit 64 resets the packet discard number C of the flow of the flow identifier FID stored in the discard number table. The discard number information processing unit 66 adds the discard number C to the discard number indicated in the discard number information of the discard number information packet. Thereafter, the processing proceeds to operation BL.

In operation BL, the discard number information processing unit 66 stores the discard number information packet having the discard number information added thereto in the switch queue 70*s*. The processing in operations BI to BL is the same as the processing by the discard control unit 60*v* in operations AG to AJ described above with reference to FIG. 9.

As far as the queue length L is less than the buffer size of the switch queue 70*s* (operation BE: N), even if the queue length L is equal to or greater than the priority queue length threshold Lth, the discard number information packet received is stored in the switch queue 70*s*. On the other hand, packets except the discard number information packet are discarded if the queue length L is equal to or greater than the priority queue length threshold Lth (operation BK: Y). In this manner, the discard number information packet is buffered in the switch queue 70*s* in preference to other packets, and is transmitted to next stage. Therefore, even when traffic is congested, the discard number information packet is easily sent to a subsequent stage.

The above-described operations of the identifier extraction unit 61, the discard number counting unit 62, the queue length detection unit 63, the determination unit 64, the discard number information processing unit 66 and the packet discard unit 67 are executed by LSI 32 depicted in FIG. 3.

<3.5. Exemplary Functional Construction of the Discard Control Unit 60*sh*>

Figure 11:
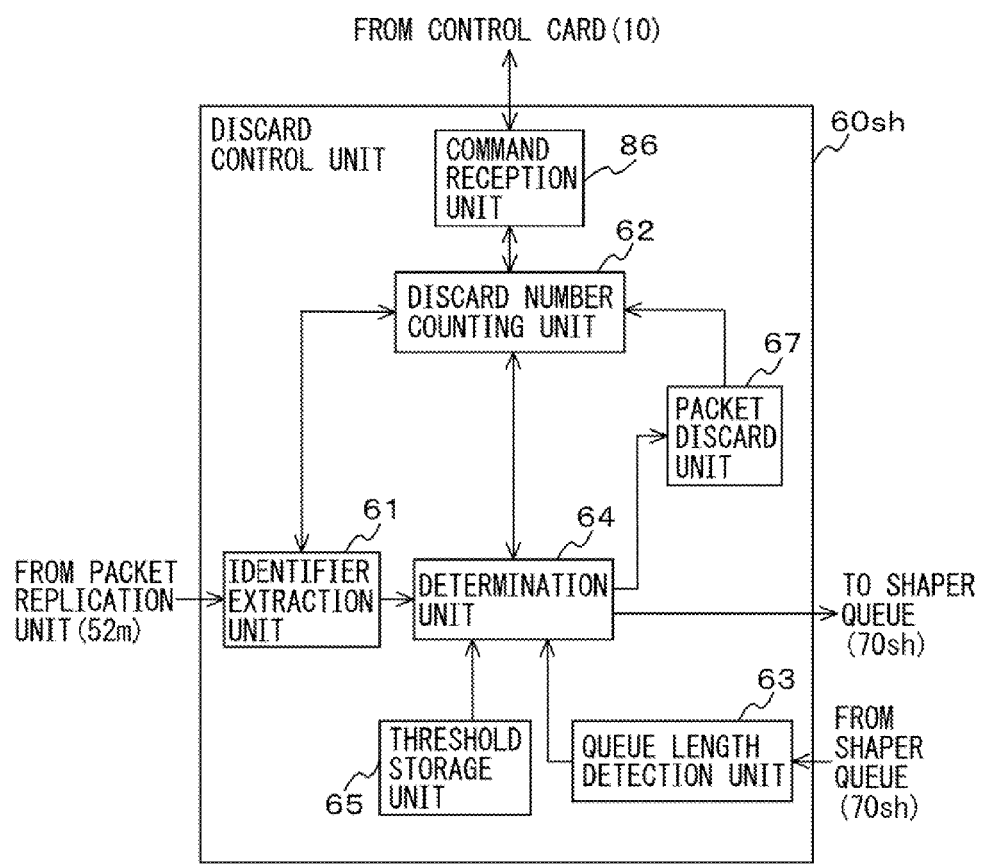
FIG. 11 is a functional block diagram of a second example of the discard control unit.

Next, an exemplary embodiment of the discard control unit 60*sh* will be described below. FIG. 11 is a functional block diagram depicting an example of the discard control unit 60*sh*. FIG. 11 depicts mainly those functions relating to the description that follows. The discard control unit 60*sh* may include constituents other than those constituents depicted in the drawing. The construction of the discard control unit 60*sh* is similar to the construction of the discard control unit 60*v*, and hence difference between them will be described below.

When a discard number information packet relating to a flow is received, the determination unit 64 updates the discard table by adding the discard number indicated in the discard number information of the discard number information packet to the discard number C for the flow stored in the discard number table. The discard control unit 60*sh* includes a command reception unit 86. The command reception unit 86 receives a discard number request command transmitted from the processor 11 of the control card 10. In response to the discard number request command, the command reception unit 86 transmits the value of the discard number C stored in the discard number table to the processor 11 of the control card 10.

The operations of the identifier extraction unit 61, the discard number counting unit 62, the queue detection unit 63, the determination unit 64, the packet discard unit 67 and the command reception unit 86 are executed by LSI 27 depicted in FIG. 2. In other exemplary embodiments, a part or all of these operations may be executed by the network processor depicted in FIG. 2.

<3.5. Operation of the Discard Control Unit 60*sh*>

Figure 12:
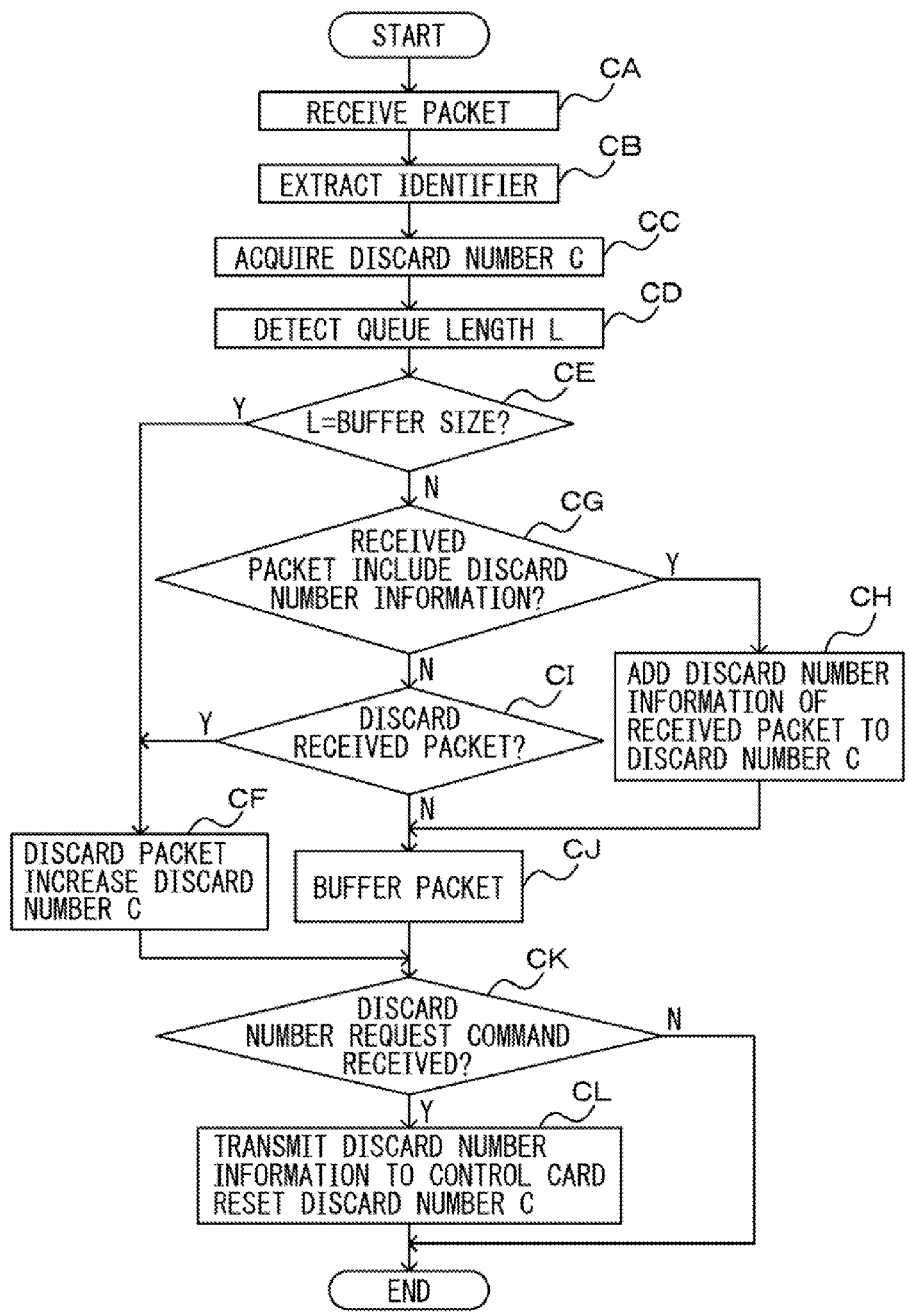
FIG. 12 is a view for illustrating a third example of the operation of the discard control unit.

FIG. 12 is a view for illustrating an example of operations of the discard control unit 60*sh*. The processing in operations CA to CD is the same as the processing of the discard control unit 60*v* in operations AA to AD described above with reference to FIG. 9. In operation CE, the determination unit 64 determines whether or not the queue length L is equal to the buffer size of the virtual output queue 70*v*. If the queue length L is equal to the buffer size of the virtual output queue 70*v* (operation CE: Y), the processing proceeds to operation AF. If the queue length L is less than the buffer size of the virtual output queue 70*v* (operation CE: N), the processing proceeds to operation CG.

In operation CF, the determination unit 64 outputs the in-device packet 3 to the packet discard unit 67. The packet discard unit 67 discards the in-device packet 3, and increase the value of the discard number for the flow identifier FID in the discard number table by one. Thereafter, the operation proceeds to operation CK. In operation CG, the determination unit 64 determines whether or not the received in-device packet 3 is a discard number information packet. If the received in-device packet 3 is a discard number information packet (operation CG: Y), the processing proceeds to operation CH. If the received in-device packet 3 is not a discard number information packet (operation CG: N), the processing proceeds to operation CI.

In operation CH, the determination unit 64 updates the discard number table by adding the discard number indicated by the discard number information of the discard number information packet to the discard number C stored in the discard number table for the flow of the flow identifier FID extracted by the identifier extraction unit 61. Then, the processing proceeds to operation CJ.

In operation CI, the determination unit 64 determines whether or not the in-device packet 3 is to be discarded based on a prescribed conditions of the priority control or frequency band control. If the in-device packet 3 is to be discarded (operation CI: Y), the processing proceeds to operation CF. If the in-device packet 3 is not to be discarded (operation CI: N), the processing proceeds to operation CJ. In operation CJ, the determination unit 64 stores the data packet 2 stored in the received in-device packet 3 into the shaper queue 70sh. The data packet 2 is outputted by the read-out unit 71sh to the communication line 40e. Thereafter, the processing proceeds to operation CK.

In operation CK, the command reception unit 86 determines whether or not a discard number request command has been received from the processor 11 of the control card 10. If a discard number request command has been received (operation CK: Y), the processing proceeds to operation CL. If a discard number request command has not been received (operation CK: N), the processing is terminated. In operation CL, the command reception unit 86 transmits the value of the discard number C stored in the discard number table to the processor 11.

<3.6. Example of Operation of the Discard Control Unit 60s>

Figure 13:
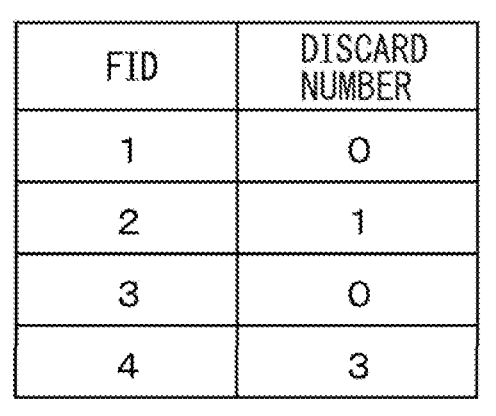

Next, an example of operation of the discard control unit 60 under presumed situation will be described. Let us suppose a situation wherein there are flows with FID="1", "2", "3", "4". FIG. 13 depicts an example of the discard number table. The discard number of discarded packets for the flow with flow identifier FID of "1", "2", "3", "4" are, respectively, "0", "1", "0", "3".

Values of the discard number notification threshold Cth, the priority queue length threshold Lth, and the buffer size are "3", "5", and "10", respectively, and the current queue is "6". In this example, unit of the priority queue length Lth and the buffer size and queue length L is number of packets stored in the virtual output queue 70v.

When an in-device packet that is not a discard number information packet with the flow identifier FID="1" arrives, the identifier extraction unit 61 acquires a discard number C="0" from the discard number counting unit 62. The determination unit 64 determines whether or not the queue length L reaches the buffer size (operation BE of FIG. 10). In this case, the queue length L="6" does not reach the buffer size="10", and discard of the in-device packet and counting of discard number are not performed.

Next, the determination unit 64 determines whether or not the received packet is a discard number information packet (operation BG of FIG. 10). In this case, the packet is not a discard number information packet, so that addition of discard number indicated by the discard number information of a discard number information packet and storage of a discard number information packet in the switch queue 70s are not performed.

Next, the determination unit 64 determines whether or not the discard number C is equal to or greater than the discard number notification threshold Cth (operation BI of FIG. 10). In this case, the discard number C="0" is less than the discard number notification threshold Cth="3". Therefore, a discard number information packet is not transmitted. The determination unit 64 does not reset the discard number C of the flow identifier FID="1" stored in the discard number table.

Next, the determination unit 64 determines whether or not the queue length L is equal to or greater than the priority queue length threshold Lth (operation BK of FIG. 10). The queue length L="6" is greater than the priority queue length threshold Lth="5", so that discard of the in-device packet and counting of the discard number are performed by the packet discard unit 67. As a result, the discard number C stored in the discard number table for the flow identifier FID="1" is increased from "0" to "1".

Next, the case where a discard number information packet with flow identifier FID="2" arrives is supposed. The identifier extraction unit 61 acquire the discard number C="1" from the discard number counting unit 62. The determination unit 64 determines whether or not the queue length L reaches the buffer size (operation BE of FIG. 10). In this case, the queue length L="6" does not reach the buffer size="10". Therefore, discard of the in-device packet and counting of the discard number are not performed.

Next, the determination unit 64 determines whether or not the received packet is a discard number information packet (operation BG of FIG. 10). In this case, the packet is a discard number information packet, so that, even if the discard number C="1" is less than the discard number notification threshold Cth="3", the discard number information processing unit 66 adds the discard number C="1" to the discard number indicated by the discard number information of the discard number information packet. The discard number information processing unit 66 stores the discard number information packet in the switch queue 70s. As a result, the queue length L increases from "6" to "7". The discard number information packet stored in the switch queue 70s is transmitted to the discard control unit 60m in subsequent stage. The determination unit 64 resets the discard number C for the flow identifier FID="2" to "0".

Next, the case where a in-device packet that is not a discard number information packet with flow identifier FID="4" arrives is supposed. The identifier extraction unit 61 acquire the discard number C="3" from the discard number counting unit 62. The determination unit 64 determines whether or not the queue length L reaches the buffer size (operation BE of FIG. 10). In this case, the queue length L="6" does not reach the buffer size="10". Therefore, discard of the in-device packet by the packet discard unit 67 and counting of the discard number are not performed.

Next, the determination unit 64 determines whether or not the received packet is a discard number information packet (operation BG of FIG. 10). In this case, the packet is not a discard number information packet, so that addition of discard number indicated by the discard number information of a discard number information packet and storage of a discard number information packet in the switch queue 70s are not performed.

Next, the determination unit 64 determines whether or not the discard number C is equal to or greater than the discard number notification threshold Cth (operation BI of FIG. 10). In this case, the discard number C="3" is equal to or greater than the discard number notification threshold Cth="3". As a result the discard number information processing unit 66 stores the discard number information packet including the discard number information indicating the discard number C="3" in the switch queue 70s. The discard number information packet stored in the switch queue 70s is transmitted to the discard control unit 60m in subsequent stage. The determination unit 64 resets the discard number C with flow identifier FID="2" stored in the discard number table to "0".

<3.7. Effect of the Exemplary Embodiment<

Next, effect of the exemplary embodiment will be described. In accordance with the present exemplary embodiment, a discard number information packet for collecting the discard number is transmitted on the data stream only if the discard number counted on a flow that is a packet discarding site in the packet apparatus 1 exceeds a threshold. Thus, as compared to the case where a discard number information packet is transmitted at a constant period, narrowing of frequency band for data stream due to transmission of unnecessary discard number information packet is reduced.

Also, in the present exemplary embodiment, a discard number information packet is stored in the queue 70 in preference to other packets in the apparatus 3 than discard number information packet, and is transmitted to a circuit in subsequent stage. Therefore, a possibility of a discard number information packet being discarded during transmission at the time of congestion can be reduced.

By storing the discard number information in a in-device packet 3 that stores data packet 2, as can be seen in the discard number information packet depicted in FIG. 8A, the destination card designator and FID used for transmission of discard number information can be shared with a data packet 2. As a result, the amount of transmission frequency band of data stream occupied by transmission of discard number information can be reduced.

On the other hand, as can be seen from the discard number information packet depicted in FIG. 8B, by dividing a in-device packet 3 storing data packet 2, it is easy to process the data packet 2 and the discard number information packet individually. For example, in an exemplary embodiment, higher priority may be given to the class specifier of the discard number information packet than to the class specifier of a in-device packet 3 carrying data packet 2. As a result, a discard number information packet is transmitted to subsequent stage in preference to a data packet 2.

<4. Second Exemplary Embodiment>

Figure 14:
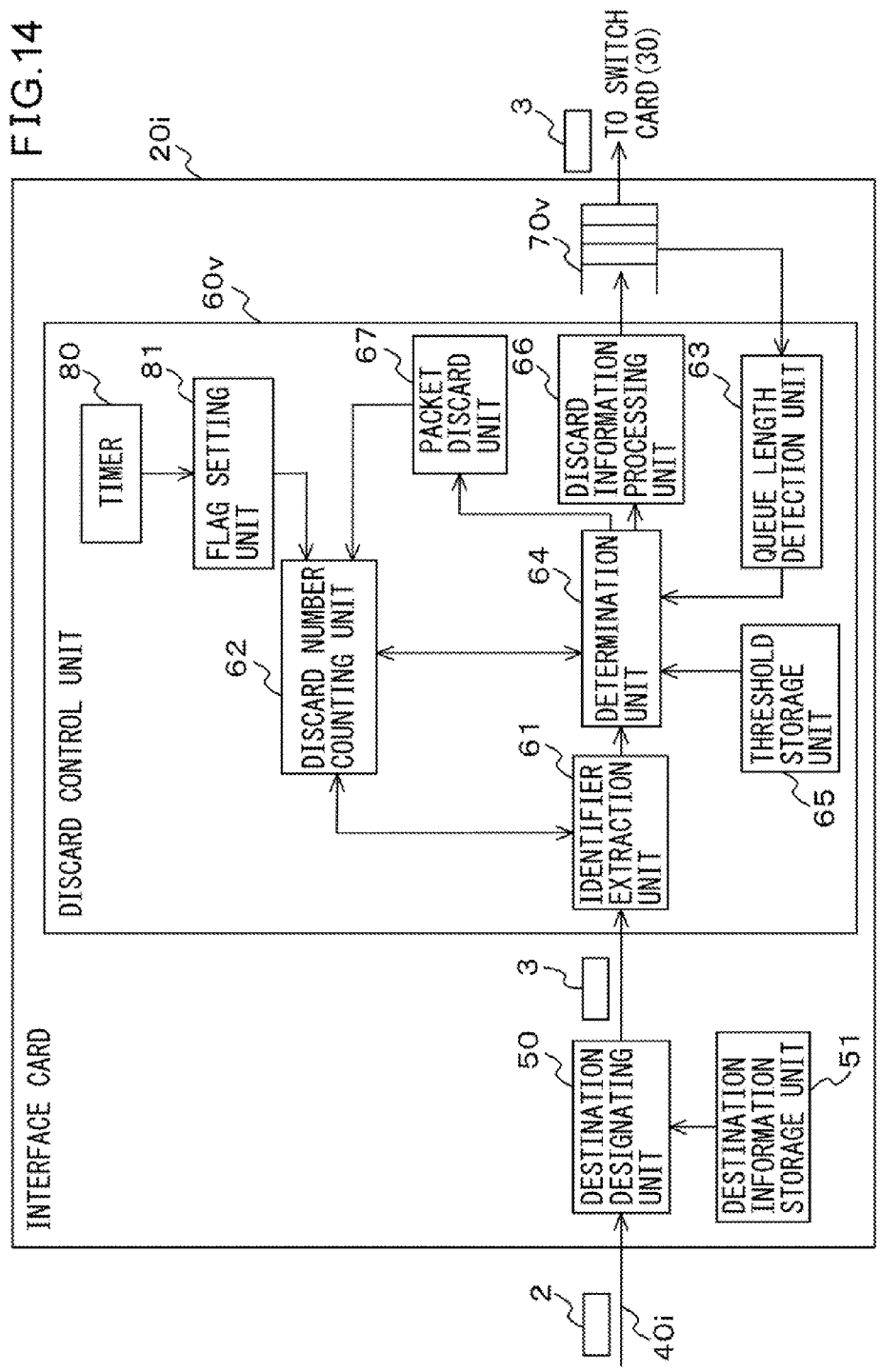
FIG. 14 is a functional block diagram of a third example of the discard control unit.

Next, another exemplary embodiment will be described. FIG. 14 is a functional block diagram depicting a second example of the discard control unit 60v. Difference from the discard control unit 60v of the first exemplary embodiment will be described below. The discard control unit 60v includes a timer 80 and a flag setting unit 81. The timer 80 repeatedly counts elapse of a constant period.

Figures 15, 16:
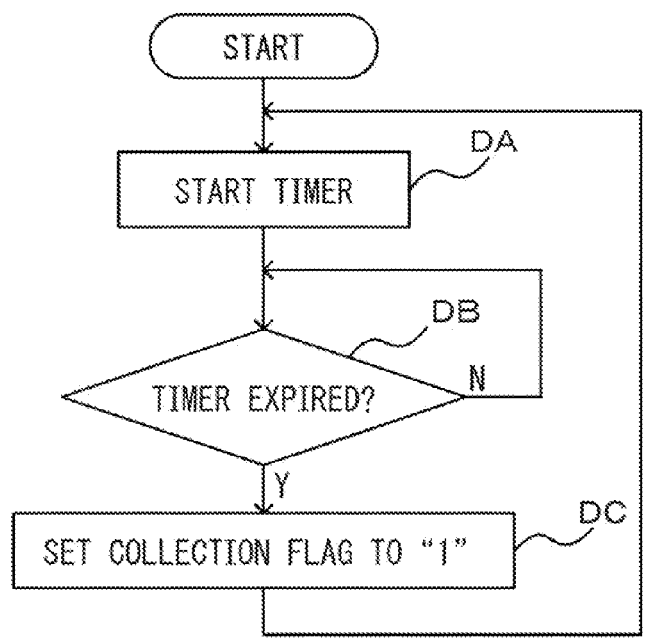
FIG. 15 is a view depicting a second example of the discard number table.
FIG. 16 is a view for illustrating an example of the operation of the flag setting unit.

The discard number table maintained by the discard number counting unit 62 includes an information element "collection flag". FIG. 15 is a view depicting a second example of the discard number table. Information element "collection flag" is a flag that indicates for each flow of flow identifier FID whether or not the time has come for collection of the discard number of discarded packets belonging to the flow. For example, value "1" indicates that time has come for collection, and value "0" indicates that it is not time for collection. In the example of FIG. 15, collection time of discard number of packets belonging to the flow with FID=1 and 3 has come, and it is not yet time for collection of discard number of packets belonging to the flow with FID=2, 4 and N.

Referring to FIG. 14, the flag setting unit 81 sets the value of the collection flag of the discard number table to "1" when the timer 80 completes counting of a constant period. Counting of the timer and setting of collection flag may be performed individually for each flow, or simultaneously for plural flows or all flows.

FIG. 16 is a view for illustrating an example of operation of the flag setting unit 81. In operation DA, the flag setting unit 81 starts the timer 80. In operation DB, the flag setting unit 81 determines whether or not the timer 80 has expired. If the timer 80 has expired (operation DB: Y), the processing proceeds to operation DC. If the timer 80 has not expired (operation DB: N), the processing returns to operation DB. In operation DC, the flag setting unit 81 sets the value of the collection flag to "1". Thereafter, the processing returns to operation DA.

Referring to FIG. 14, the determination unit 64 acquires the value of the collection flag stored in the discard number table for the flow identifier FID extracted by the identifier extraction unit 61. If the discard number C is greater than "0" and the value of the collection flag is set to "1", even if the discard number C is less than the discard number notification threshold Cth, the determination unit 64 determines that the discard number information packet is to be sent out.

Figure 17:
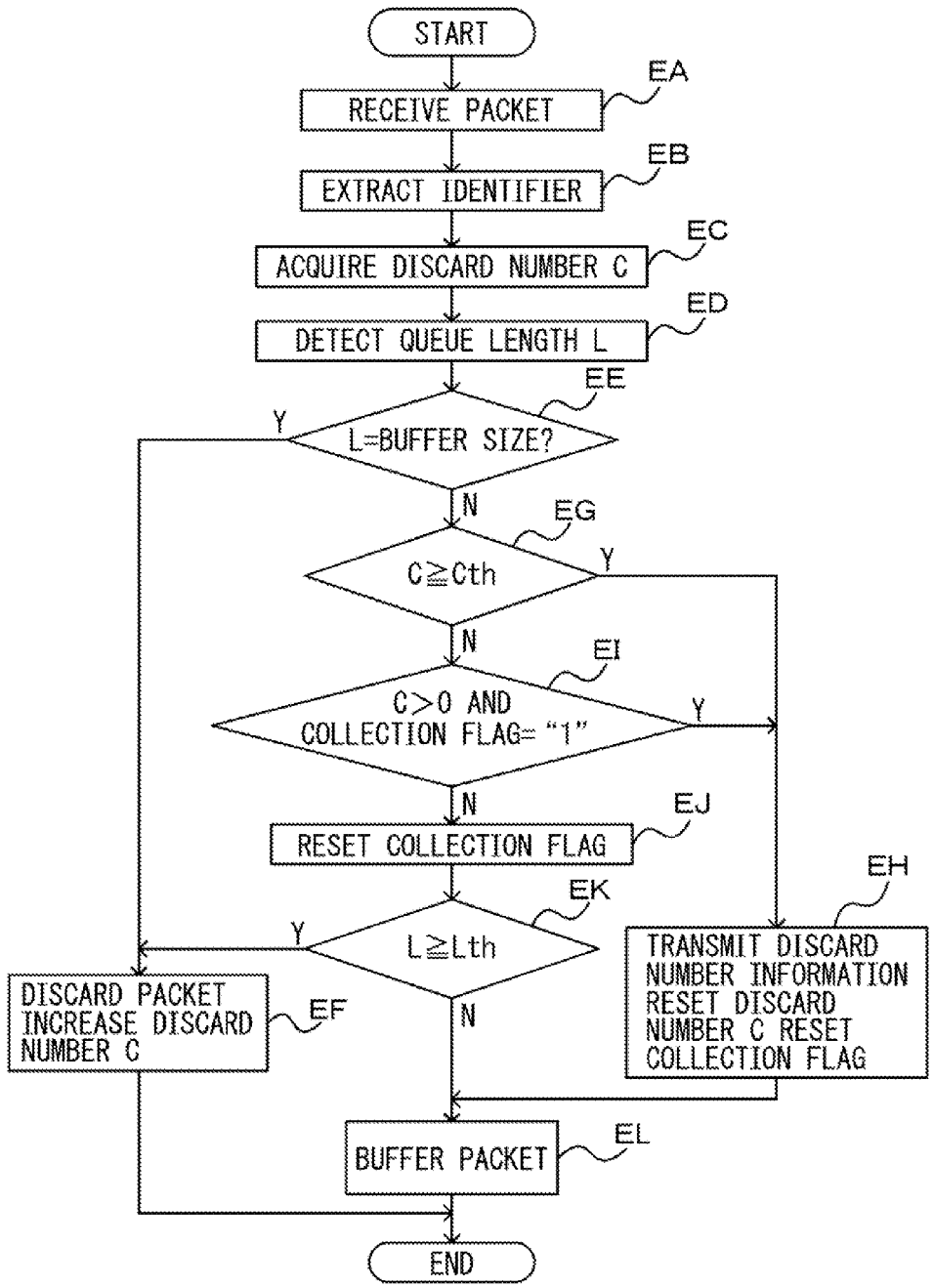
FIG. 17 is a view for illustrating a fourth example of the operation of the discard control unit.

FIG. 17 is a view for illustrating a second example of operation of the discard control unit 60v. The processing in operations EA to EG is the same as the processing in operations AA to AG described above with reference to FIG. 9. In operation EI, the determination unit 64 acquires the value of the collection flag stored in the discard number table for the flow of the received in-device packet 3. The determination unit 64 determines whether or not the discard number C is greater than "0" and the value of the collection flag is set to "1".

If discard number C is greater than "0" and the value of the collection flag is set to "1" (operation EI: Y), the processing proceeds to operation EH. If discard number C is "0" or the value of the collection flag is "0" (operation EI: N), the processing proceeds to operation EJ. In operation EH, the discard number information processing unit 66 stores the discard number information packet indicating the discard number C in the virtual output queue 70v, and the discard number information packet is outputted to the switch card 30 in subsequent stage. Also, the determination unit 64 resets the value of the collection flag for the flow of the in-device packet 3 to "0". Thereafter, the processing proceeds to operation EL.

In operation EJ, the determination unit 64 resets the value of the collection flag for the flow of the in-device packet 3 to "0". Thereafter, the processing proceeds to operation EK. The processing in operations EK to EL is the same as the processing in operations AI to AJ described above with reference to FIG. 9.

The discard control unit 60s and the discard control unit 60m may also include the timer 80 and the flag setting unit 81. Similarly, the determination unit 64 of the discard control unit 60s and the discard control unit 60m may also determine whether or not the discard number information is to be sent out based on the value of the collection flag of the discard number table.

The above described operations of the timer 80 and the flag setting unit 81 are executed by LSI 27 depicted in FIG. 2. In other exemplary embodiments, a part or all of these operations may be executed by the network processor 26 depicted in FIG. 2.

In accordance with the present exemplary embodiment, it is possible to collect the discard number information the discard control unit has at least at a constant interval while the discard control unit 60 has the discard number information. Therefore there is a possibility of the discard number information being stored for a long time at a packet discarding site on the transmission path in the packet apparatus 1.

<5. Third Exemplary Embodiment>

Figure 18:
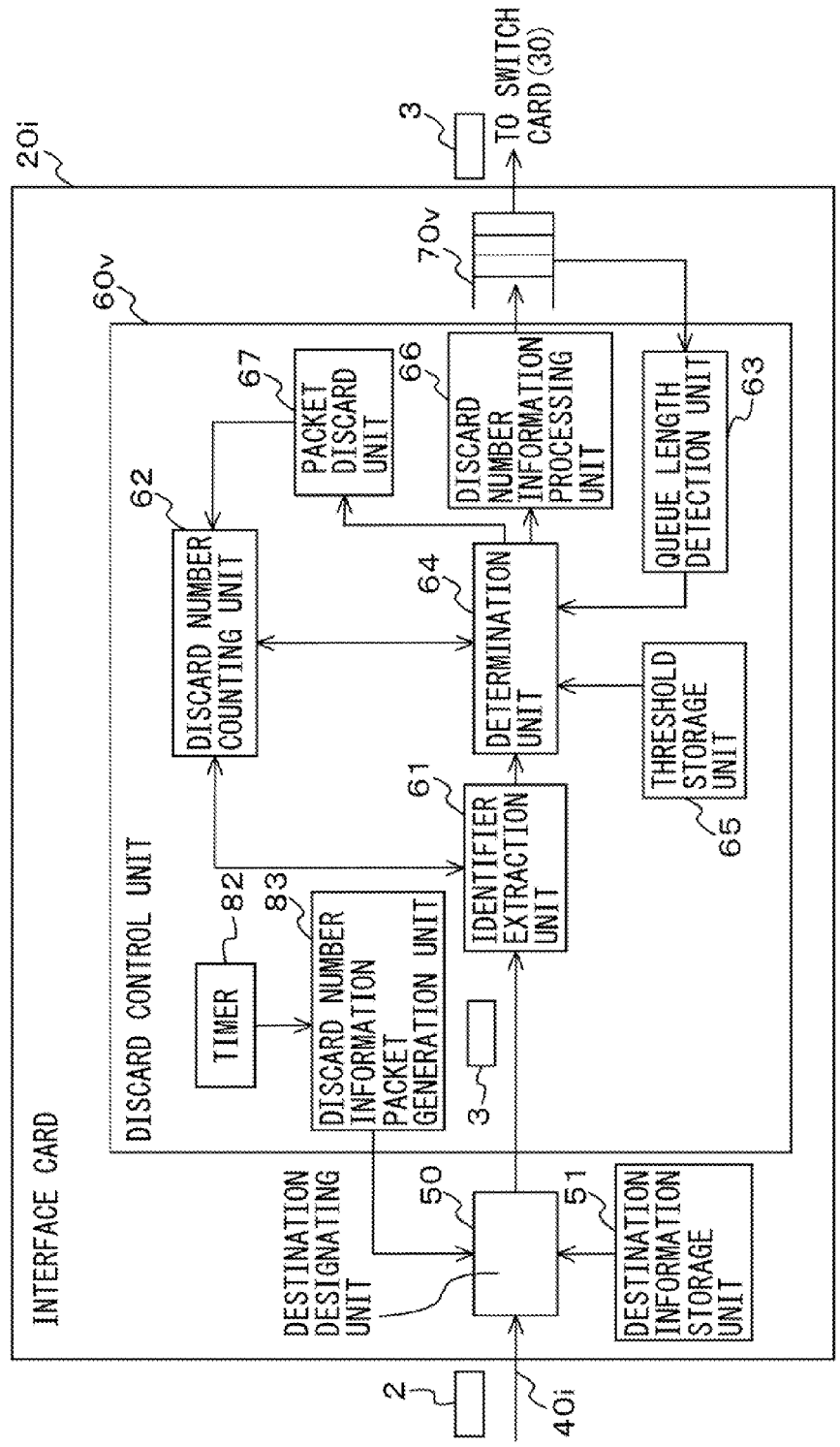
FIG. 18 is a functional block diagram of a fourth example of the discard control unit.

Next, other exemplary embodiment will be described. FIG. 18 is a functional block diagram depicting a third example of the discard control unit 60v. Difference from the discard control unit 60v of the first exemplary embodiment will be described below. The discard control unit 60v includes a timer 82 and a discard number information packet generation unit 83.

The timer 82 repeatedly counts elapse of a constant period. Each time the timer completes counting of the constant period, the discard number information packet generation unit 83 generates a discard number information packet for collecting the discard number for all flows inputted and outputted by the packet apparatus 1. The discard number information packet generation unit 83 designates the flow for collecting the discard number by setting a value of the information element "FID" of the discard number information packet.

The discard number information packet generation unit 83 inputs the generated packet to the destination designating unit 50 provided upstream of any of the packet discarding sites in the packet apparatus 1. The destination designating unit 50 specifies the destination interface card 20e and the class on the egress side based on the information element "FID", and after storing these in the discard number information packet, inputs it to the discard control unit 60v.

Figure 19:
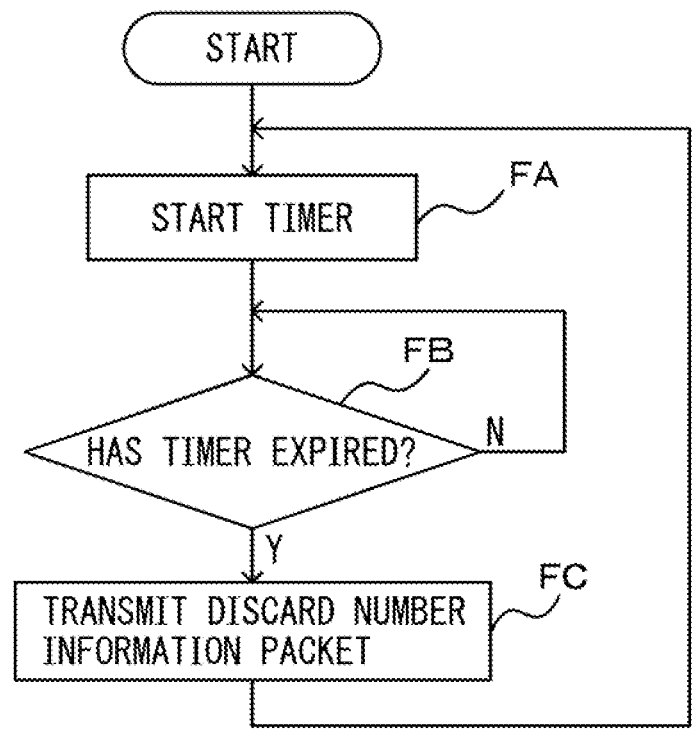
FIG. 19 is a view for illustrating a first example of the operation of the discard number information packet generating unit.

FIG. 19 is a view for illustrating a first example of the operation of the discard number information packet generation unit 83. In operation FA, the discard number information packet generation unit 83 starts the timer 82. In operation FB, the discard number information packet generation unit 83 determines whether or not the timer 82 has expired. If the timer 82 has expired (operation FB: Y), the processing proceeds to operation FC. If the timer 82 has not expired (operation FB: N), the processing returns to operation FB. In operation FC, the discard number information packet generation unit 83 generates a discard number information packet, and transmits it to the destination designating unit 50. Thereafter, the processing returns to operation FA.

The discard control unit 60v of the present exemplary embodiment receives the discard number information packet generated by the discard number information packet generation unit 83. Therefore, the discard number information processing unit 66 of the discard control unit 60v carries out addition of the discard number information of the discard number information packet and transfer of the discard number information packet just as the operation of the discard control unit 60s described above in <3.3. Operation of the discard control units 60s and 60 m>. This applies also to the fourth exemplary embodiment described below.

The above-described operations of the timer 82 and the discard number information packet generation unit 83 are executed by LSI 27 depicted in FIG. 2. In other exemplary embodiments, a part or all of these operations may be executed by the network processor 26 depicted in FIG. 2.

In accordance with the present exemplary embodiment, the discard number information packets of all flows are transmitted at a constant period. The discard number information packet collects the discard number counted by all discard control units 60 successively beginning from the discard control unit 60v in the first stage. Therefore, the long-time retention of the discard number information at packet discarding sites in the transmission path in the packet apparatus 1 can be prevented.

<6. Fourth Exemplary Embodiment>

Figure 20:
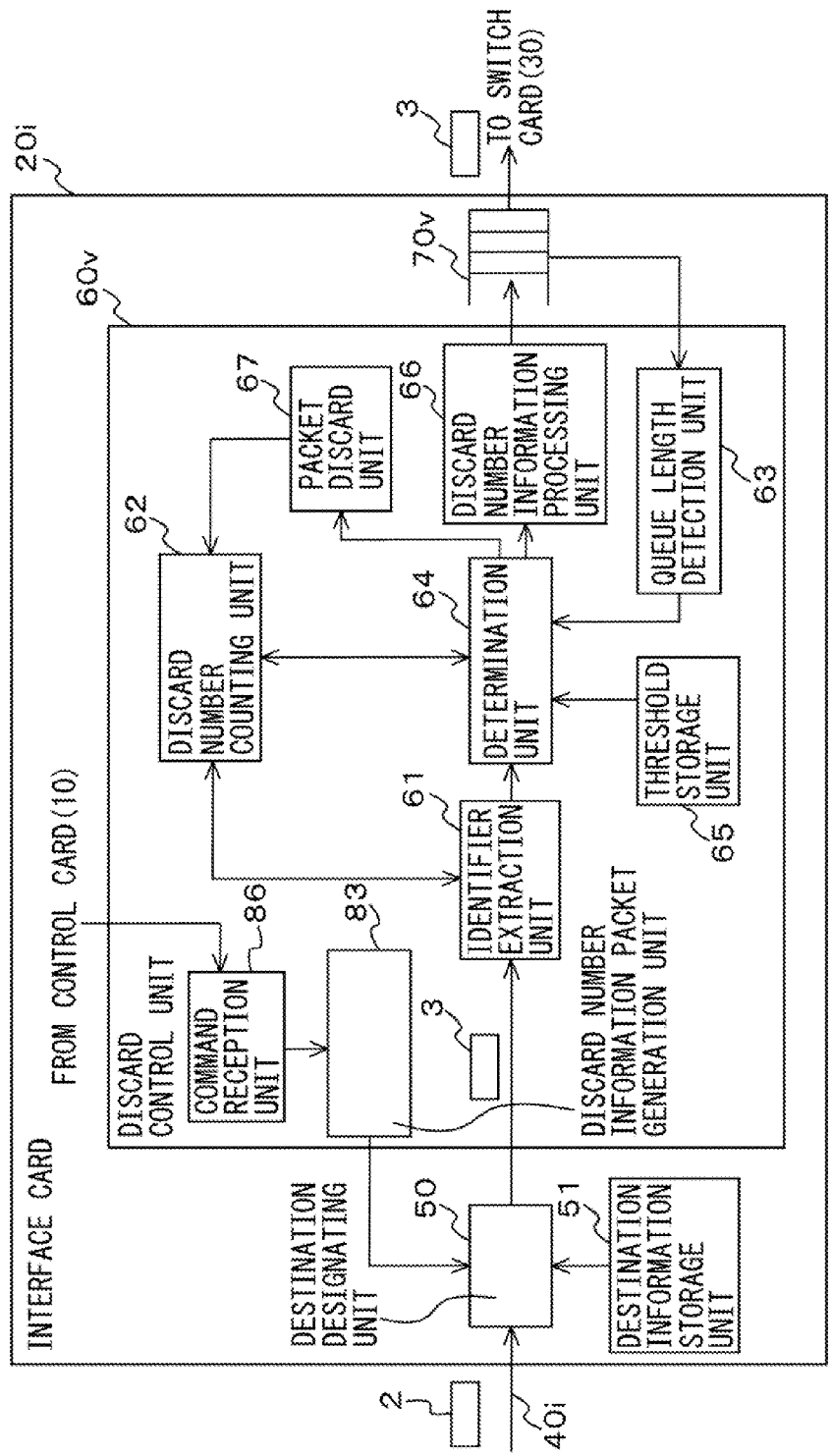
FIG. 20 is a functional block diagram of a fifth example of the discard control unit.

Next, another exemplary embodiment will be described. FIG. 20 is a functional block diagram depicting a fourth example of the discard control unit 60v. Difference from the discard control unit 60v of the first exemplary embodiment will be described below. The discard control unit 60v includes a command reception unit 86. The command reception unit 86 receives a discard number information packet transmission command transmitted from the processor 11 of the control card 10. The processor 11 of the control card 10 issues the discard number information packet transmission command upon reception of a command from a user, for example.

In response to the discard number information packet transmission command, the command reception unit 86 outputs an instruction signal for causing the discard number information packet generation unit 83 to generate a discard number information packet. In response to the instruction signal, the discard number information packet generation unit 83 generates a discard number information packet for collecting the discard number for each of all the flows inputted and outputted by the packet apparatus 1, and inputs it to the destination designating unit 50.

Figure 21:
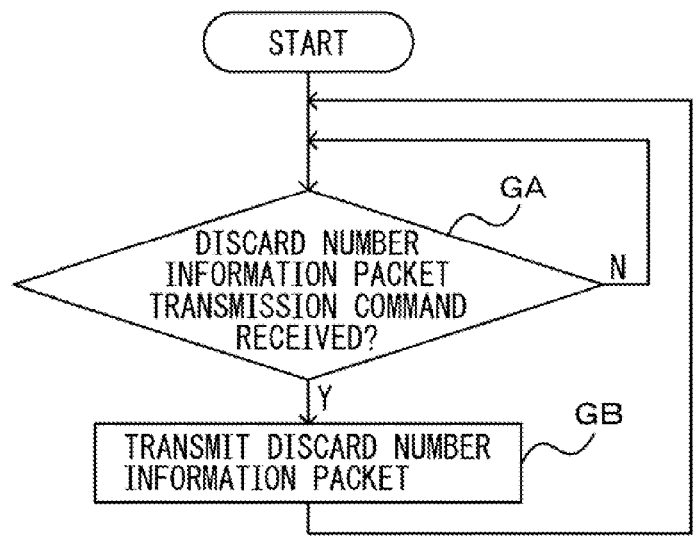
FIG. 21 is a view for illustrating a second example of the operation of the discard number information packet generating unit.

FIG. 21 is a view for illustrating a second example of operation of the discard number information packet generation unit 83. In operation GA, the command reception unit 86 determines whether or not a discard number information packet transmission command has been received. If a discard number information packet transmission command has been received (operation GA: Y), the processing proceeds to operation GB. If a discard number information packet transmission command has not been received (operation GA: N), the processing returns to operation GA. In operation GB, the discard number information packet generation unit 83 generates a discard number information packet, and transmits it to the destination designating unit 50. Thereafter, the processing returns to operation GA.

The third exemplary embodiment may also include the same command reception unit 86 as the fourth exemplary embodiment, and in response to a discard number information packet transmission command, the discard number information packet generation unit 83 may transmit a discard number information packet to the destination designating unit 50.

The above-described operations of the command reception unit 86 and the discard number information packet generation unit 83 are executed by LSI 27 depicted in FIG. 2. In other exemplary embodiments, a part or all of these operations may be executed by the network processor 26 depicted in FIG. 2.

In accordance with the present exemplary embodiment, when the processor 11 of the control card 10 outputs the command, a discard number information packet can be transmitted in the packet apparatus 1. The discard number information packet collects the discard number counted by all the discard control units 60 successively beginning from the first discard control unit 60v. Therefore, the processor 11 of the control card 10 can acquire the latest information on discard number counted at all the packet discard sites on the transmission path in the packet apparatus 1 at the time of command output. By issuing a discard number information packet transmission command in response to reception of command from a user, the user can acquire the latest information on discard number counted at all the packet discard sites on the transmission path in the packet apparatus 1.

<7. Fifth Exemplary Embodiment>

Next, another exemplary embodiment will be described. The packet apparatus 1 counts, also for multicast packets, the sum of all discard number on the path for each flow transmitting data in multicast packets. This function is based on, for example, use of MEF (Metro Ethernet Forum). By collecting the discard number on each flow for multicast packets, when, for example, service failure occurs in a part of users of multicast packets, service failure situation can be captured for each user.

Referring to FIG. 4, transfer of multicast packets in the packet apparatus 1 will be described. When a data packet 2 arrives, the destination designating unit 50 determines whether the data packet 2 is a multicast packet or a unicast packet. The destination designating unit 50 outputs a in-device packet 3 with the in-device header added to the data packet 2.

Figure 22:
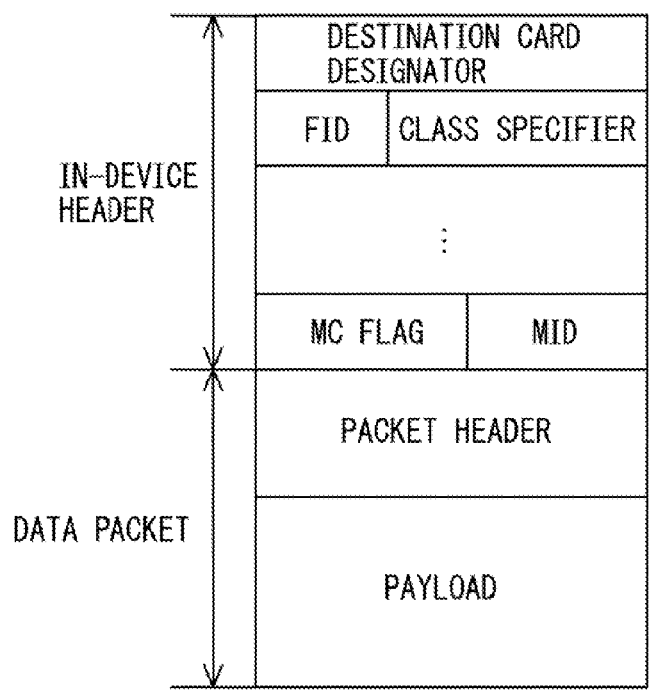
FIG. 22 is a view depicting a second example of format of the in-device packet.

FIG. 22 depicts a second example of format of a in-device packet 3. The in-device header includes information elements "destination card designator", "FID", "MC flag", "class specifier", and "MID". Content of the information elements "destination card designator" and "class specifier" is the same as the example depicted in FIG. 5. The information element "MC flag" indicate whether the data packet 2 is a multicast packet or unicast packet.

If the data packet 2 is unicast, a flow identifier for identifying the flow of the data packet 2 is stored in the information element "FID". If the data packet 2 is a multicast packet, the destination designating unit 50 detects the multicast group of the data packet 2, and stores multicast identifier for identifying the multicast group in the information element "MID". In the description that follows, a packet for multicast group identified by the multicast identifier MID may be represented simply as a multicast packet of multicast identifier MID.

When a in-device packet 3 carrying a multicast packet arrives at the packet replication unit 52s, the packet replication unit 52s specifies the interface card 20e on the egress side to which the in-device packet 3 is to be transferred. In one exemplary embodiment, the packet replication unit 52s refers to the bit map table depicted in FIG. 23A, and specifies the destination interface card 20e. The bit map table includes information elements "MID" and "bitmap".

The information element "MID" represents a multicast identifier. The information element "bitmap" is a bitmap of digits corresponding to the interface card 20e on the egress side. In this example, the number of digits of the bitmap is "64". Value of each digit of the bitmap is either "1" or "0", and the bit position of the value "1" indicates the interface card 20e to which each multicast identifier is to be transferred. For example, in the example of FIG. 23A, the bitmap corresponding to the information element "MID"=1 has the value "1" in the first, the second and the $64^{th}$ bits. Therefore, as the destination of transfer of the multicast packet with the multicast identifier "MID"=1, the first, second and $64^{th}$ interface cards 20e are designated.

The packet replicating unit 52s replicates the in-device packet 3 to provide the in-device packets 3 in number of the interface cards 20e. The packet replicating unit 52s stores, in the in-device header of respective in-device packet, the designator of the destination interface card 20e. As a result, the in-device packets 3 storing the multicast packets are transferred to respective interface cards 20e designated by the bitmap table.

When a multicast packet arrives at the packet replication unit 52m of any of the destination interface cards 20e, the packet replication unit 52m specifies the unicast flow for transmitting data of the multicast packet. In an exemplary embodiment, the packet replication unit 52m specifies the unicast flow with reference to tables depicting the list structure in FIG. 23B and FIG. 23C.

The table in FIG. 23B has information elements "MID" and "start FID". The information element "MID" indicates the multicast identifier. The information element "start FID" indicates the leading flow identifier in the list of flow identifiers of unicast flow transmitting the multicast data of each multicast identifier.

The table in FIG. 23C has information elements "FID" and "next FID" and "end flag". The information element "FID" indicates any of the flow identifiers included in the list of flow identifiers. The information element "next FID" indicates, in the list of flow identifiers, the flow identifier next to the flow identifier of the information element "FID". The information element "end flag" indicates whether or not the flow identifier of the information element "next FID" is the last element of the list of flow identifiers. If the information element "end flag" is "1", the flow identifier of the information element "next FID" is the last element of the list, and If the information element "end flag" is "0", there is next flow identifier that follows the flow identifier of the information element "next FID".

For example, in the example of FIG. 23B and FIG. 23C, in the list of flow identifiers of unicast flow corresponding to the information element "MID"=1, the leading flow identifier is "3". The flow identifier "3" is followed by the flow identifier "4", and the flow identifier "4" is followed by the flow identifier "5". The flow identifier "5" is the last element in the list of flow identifiers. Thus, the list structure of FIG. 23A and FIG. 23C indicates that flow identifiers of unicast flow transmitting the data of multicast packet of the multicast identifier="1" are "3", "4", and "5".

The packet replication unit 52m replicates the in-device packet 3 to provide the in-device packets 3 in number of the specified unicast flows. The packet replication unit 52m stores the specified flow identifier in the information element "FID" of respective in-device packets 3. As a result, the unicast flows for transmitting respective in-device packets 3 are specified. The packet replication unit 52m inputs the in-device packet 3 in the discard control unit 60sh. The transfer operation of the multicast packet by the packet replication unit 52s and the packet replication unit 52m is only an example for description of the exemplary embodiment. The present exemplary embodiment may adopt other transfer operation.

Figure 24:
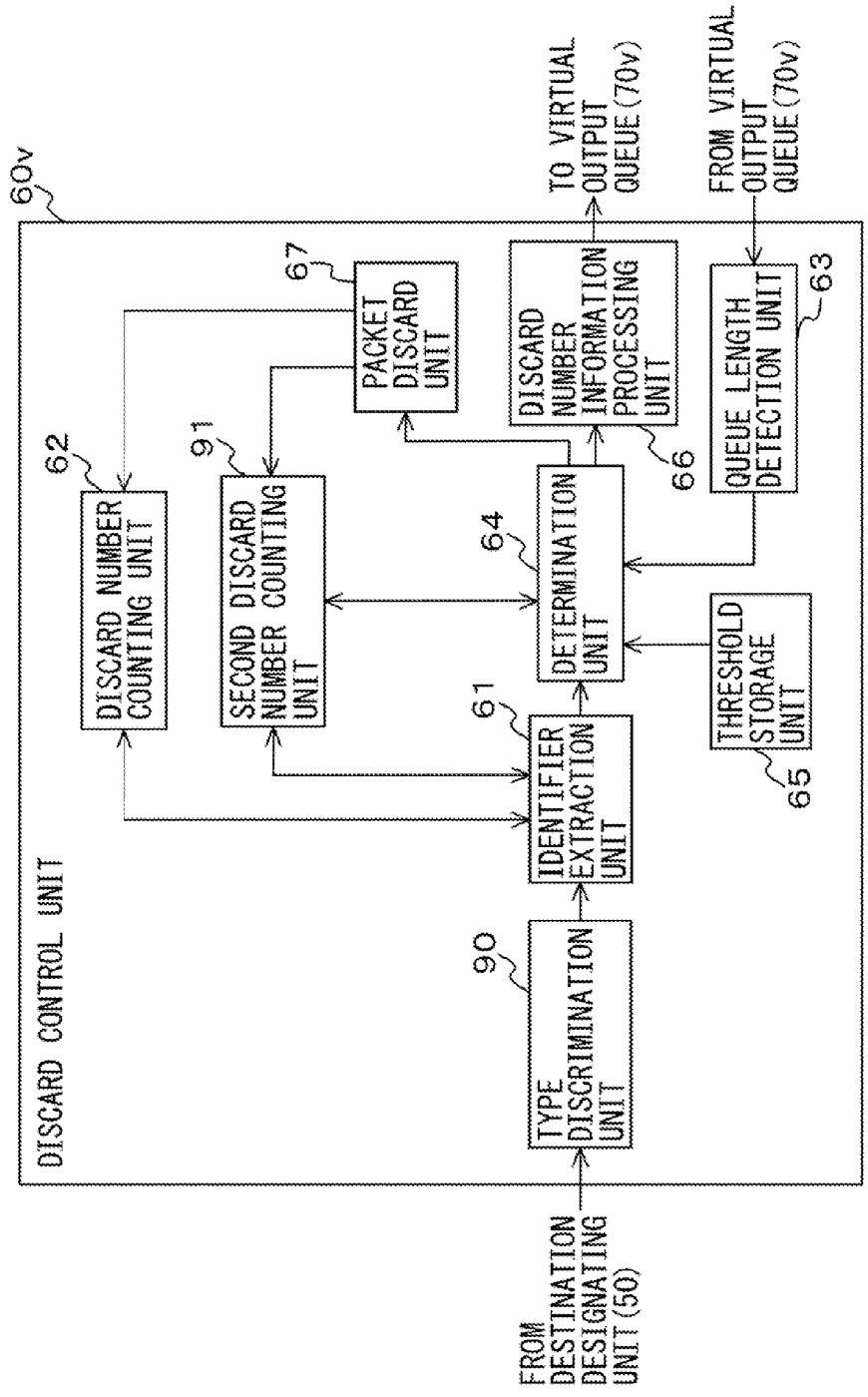
FIG. 24 is a functional block diagram of a sixth example of the discard control unit.

FIG. 24 is a functional block diagram depicting a fifth example of the discard control unit 60v. Difference from the discard control unit 60v of the first exemplary embodiment will be described below. The discard control unit 60v includes a type discrimination unit 90 and a second discard number counting unit 91. The type discrimination unit 90 extracts the information element "MC flag" from the in-device header of the in-device packet 3 arriving at the virtual output queue 70v. The type discrimination unit 90 determines whether the in-device packet 3 stores a multicast packet or a unicast packet based on the information element "MC flag".

The processing in the case where the in-device packet 3 stores a unicast packet is the same as the processing described above in <3. First exemplary embodiment>. In the case where the in-device packet 3 stores a multicast packet, the identifier extraction unit 61 extracts multicast identifier MID from the in-device header. The identifier extraction unit 61 acquires the discard number C of multicast packets of this multicast identifier MID from the second discard number counting unit 91.

The second discard number counting unit 91 maintains the discard number table for storing the discard number of multicast packets of respective identifier MID discarded by the discard control unit 60v. Structure of the discard number table is the same as the structure of the discard number table depicted in FIG. 7.

The identifier extraction unit 61 outputs the discard number C acquired from the discard number counting unit 62 to the determination unit 64. The queue length detection unit 63 monitors the queue length L of the virtual output queue 70v, and outputs the queue length information of the virtual output queue 70v to the determination unit 64. The determination unit 64 acquires the discard number notification threshold Cth and the priority queue length threshold Lth stored in the threshold storage unit 65.

The determination unit 64 determines whether or not the in-device packet 3 is to be discarded based on the detected queue length L, the buffer size of the virtual output queue 70v, and the priority queue length threshold Lth. The determination unit 64 determines, for each multicast identifier MID, whether or not the discard number information of multicast packets of the identifier MID to the switch card 30 in the subsequent stage, based on the discard number Cacquired from the discard number counting unit 62 and the discard number notification threshold Cth. The determination of the propriety of discarding and the determination of propriety of transmission of the discard information are same as described above in <3. First exemplary embodiment>.

Figure 25A:
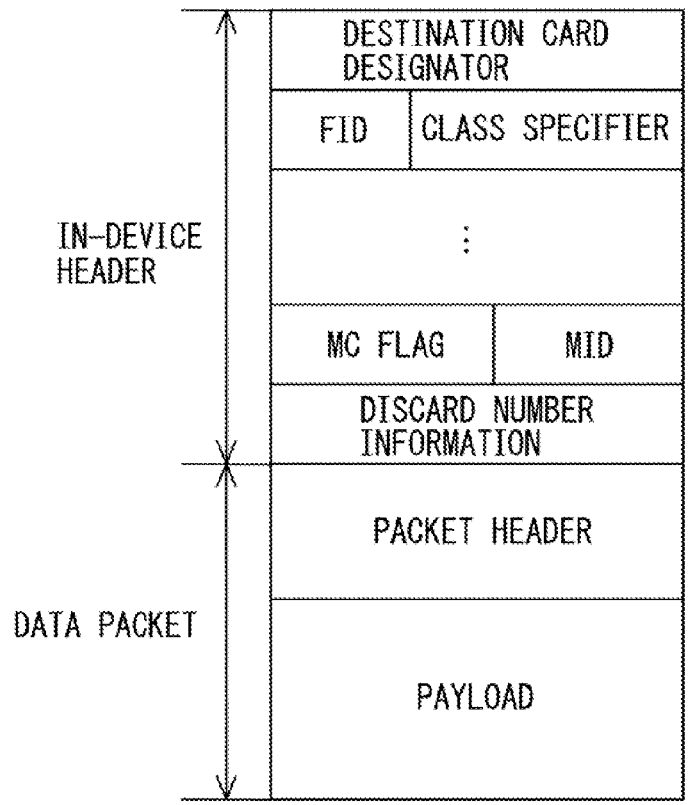
FIG. 25A is a view depicting a third example of format of the discard number information packet.
Figure 25B:
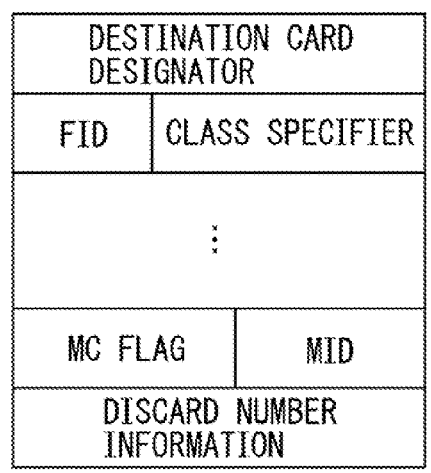
FIG. 25B is a view depicting a fourth example of format of the discard number information packet.

If the determination unit 64 determines that the discard number information is to be sent out, the discard number information processing unit 66 stores the discard number information in the discard number information packet for each multicast identifier MID. FIG. 25A and FIG. 25B are views depicting a third example and a fourth example of format of the discard number information packet. Content of the information element "destination card designator", "FID", and "class specifier", "MC flag", and "MID" is the same as in the example depicted in FIG. 22. The multicast identifier MID identifies of which multicast identifier MID the discard number stored in the discard number information packet is the discard number of multicast packet.

In the discard number information packet of FIG. 25A, the discard number information is stored in an option field in the in-device header added to the data packet 2. The example of the discard number information packet of FIG. 25B is newly generated in order to transmit the discard number information separately from the in-device packet including data packet 2. The discard number information processing unit 66 stores the discard number information packets provided for each multicast identifier MID in the virtual output queue 70v. The packet stored in the virtual output queue 70v is read out by the read-out unit 71 depicted in FIG. 4, and is outputted to the switch card 30 in the next stage.

FIG. 26 is a view for illustrating a fifth example of operation of the discard control unit 60v. In operation HA, the discard control unit 60v receives a in-device packet 3 arriving at the virtual output queue 70v. In operation HB, the type discrimination unit 90 determines whether or not the in-device packet 3 stores a multicast packet. If the in-device packet 3 stores a unicast packet (operation HB: N), the subsequent processing is the same as the processing in operation AB and thereafter. If the in-device packet 3 stores a multicast packet (operation HB: Y), the processing proceeds to operation HC.

In operation HC, the identifier extraction unit 61 extracts multicast identifier MID from the in-device header. In operation HD, the identifier extraction unit 61 acquires the discard number of multicast packet of this multicast identifier MID from the second discard number counting unit 91.

The processing in operations HE to HG is the same as the processing in operations AD to AF depicted in FIG. 9. In operation HH, the determination unit 64 determines whether or not the discard number C is equal to or greater than the discard number notification threshold Cth. If the discard number C is equal to or greater than the discard number notification threshold Cth (operation HH: Y), the processing proceeds to operation HI. If the discard number C is less than the discard number notification threshold Cth (operation HH: N), the processing proceeds to operation HJ.

In operation HI, the discard number information processing unit 66 stores a discard number information packet indicating the discard number C by multicast identifier MID in the virtual output queue 70v. The discard number information packet is outputted by the read-out unit 71 to the switch card 30 in subsequent stage. The determination unit 64 resets the discard number C of multicast packet of multicast identifier MID stored in the discard number table. Then, the processing proceeds to operation HK. The processing in operations HJ and HK is the same as the processing in operations AI and AJ depicted in FIG. 9.

The above-described operations of the type discrimination unit 90 and the second discard number counting unit 91 are executed by LSI 27 depicted in FIG. 2. In other exemplary embodiments, a part or all of these operations may be executed by the network processor 26 depicted in FIG. 2.

The discard control unit 60s and the discard control unit 60m similarly include the type discrimination unit 90 and the second discard number counting unit 91, and in the same manner as the discard control unit 60v, transmits the discard number information packet for each multicast identifier. On the discard number information packet transmitted for each multicast identifier, the discard control unit 60s and the discard control unit 60m perform addition of the discard number information and transfer of the discard number information packet, in the same manner as described above in <3.4. Operation of discard control unit 60s>.

Next, An example of operation of the discard control unit 60 for collecting the discard number of multicast packets in a presumed situation will be described. As in the example described above with reference to FIG. 23, it is supposed that the multicast packet of the multicast identifier MID=1 is transferred to the first, the second and the $64^{th}$ interface card 20e on the egress side. Also, the $64^{th}$ interface card 20e replicates the multicast packet of the multicast identifier MID=1 to provide packets for unicast flow for flow identifier FID="3", "4", and "5".

FIG. 27A depicts the state of the discard number table maintained by the discard control unit 60v as depicted in FIG. 4. FIG. 27B depicts the state of the discard number table maintained by the discard control unit 60s that execute packet discarding in the switch queue 70s accumulating packets to be outputted to $64^{th}$ interface card 20e. FIG. 27C and FIG. 27D respectively depict the state of the discard number tables maintained by the discard control unit 60m and 60sh of the $64^{th}$ interface card 20e.

Before the discard number information packet is transmitted, the discard number of the multicast packets of multicast identifier MID=1 stored by the discard control unit 60v and the discard control unit 60s and 60m are "200", "100", and "50". Before the discard number information packet is transmitted, the discard number of the packets of the flow identifier FID="3", "4", and "5" stored by the discard control unit 60sh are respectively "c1", "c2", and "c3".

If the discard number="200" stored in the discard control unit 60v is equal to or greater than the discard number notification threshold Cth, the discard control unit 60v transmits the discard number information packet storing discard number information of multicast packets of multicast identifier MID=1. As a result, the discard number stored in the discard control unit 60v is reset to "0". Value of the discard number information stored by the discard number information packet is "200".

When the discard number information packet arrives at the packet replication unit 52s, the packet replication unit 52s replicates the discard number information packet to provide the discard number information packets to be transferred to the first, the second and the $64^{th}$ interface cards 20e, respectively. The discard number information packets are sent to the switch queue 70s that accumulates the packets to be outputted to the first, the second and the $64^{th}$ interface cards 20e.

When the discard number information packet arrives at the discard control unit 60s, the discard control unit 60s adds the discard number "100" of multicast packets of multicast identifier MID=1 stored in it to the discard number information of the discard number information packet. As a result, the value of the discard number information stored by the discard number information packet is increased to "300". The discard number stored in the discard control unit 60s is reset to "0". This discard number information packet is sent to the 64$^{th}$ interface card 20e.

When the discard number information packet arrives at the discard control unit 60m, the discard control unit 60m adds the discard number "50" of multicast packets of multicast identifier MID=1 stored in it to the discard number information of the discard number information packet. As a result, the value of the discard number information stored by the discard number information packet is increased to "350". The discard number stored in the discard control unit 60m is reset to "0".

When the discard number information packet arrives at the packet replication unit 52m, the packet replication unit 52m replicates the discard number information packet to provide the discard number information packet with flow identifier FID="3", "4", and "5". The packet replication unit 52m transmits the discard number information packet to the discard control unit 60sh.

When the discard number information packet arrives at the discard control unit 60sh, the discard control unit 60sh adds the value "350" of the discard number information of the received discard number information packet to the discard number of packets of the flow identifier FID="3", "4", and "5" stored in the discard control unit 60sh. As a result, the discard number is updated to "c1+350", "c2+350", and "c3+350".

Thus, when multicast packets are discarded in the packet transmission path, a discard number information packet is transmitted for each multicast identifier, and by copying of a multicast packet, the discard number information packet for each flow identifier is generated. Therefore, when multicast packets are discarded, the discard number is added in the discard control unit 60sh to the discard number for each flow transmitting the data of the multicast packet. Thus, in accordance with the present exemplary embodiment, when multicast packets are discarded, the discard number can be collected for each flow transmitting the data of the multicast packet.

In the present exemplary embodiment, the discard number information packet carrying the discard number of multicast packet as the discard number for each flow transmitting the data of the multicast packet is generated by multicast copying of the packet apparatus 1. Therefore, the discard number of the multicast packet can be collected for each flow without substantially modifying the packet apparatus 1.

In the discard control unit 60 of the present fifth exemplary embodiment as in the second exemplary embodiment described above, the timer 80 and the flag setting unit 81 may be provided. In the discard control unit 60v of the present fifth exemplary embodiment as in the third and the fourth exemplary embodiments described above, the timer 82, the discard number information packet generation unit 83 and the command reception unit 86 may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A packet relay apparatus comprising a first packet processing circuit and a second packet processing circuit, the first packet processing circuit executes:
    discarding of some data packets from among data packets, and transferring the rest of the data packets to the second packet processing circuit;
    counting discard number of the data packets;
    determining whether or not the discard number is equal to or greater than a threshold; and
    transferring, if the discard number is equal to or greater than the threshold, a discard number information packet including discard number information indicating the discard number to the second packet processing circuit;
    and that the second packet processing circuit executes:
    discarding some data packets from among the data packets;
    counting discard number of the data packets; and
    collecting the discard number counted by the second packet processing circuit and the discard number indicated by the discard number information included in the discard number information packet, wherein the first packet processing circuit does not discard the discard number information packet that is a packet which includes discard number information indicating the discard number and is generated separately from the data packet, but transfers it to the second packet processing circuit, and
    the packet relay apparatus further comprising a storage unit that stores a queue for accumulating the data packet and the discard number information packet;
    the first packet processing circuit executes:
    detecting queue length of the queue;
    discarding, if the queue length is longer than a first threshold, the data packet other than the discard number information packet;
    accumulating, if the queue length is shorter than a second threshold that is longer than the first threshold, the discard number information packet in the queue; and
    transferring packets accumulated in the queue to the second packet processing circuit.

2. The packet relay apparatus according to claim 1, wherein the discard number information packet is a packet having discard number information indicating the discard number added to the data packet.

3. The packet relay apparatus according to claim 1, wherein the first packet processing circuit executes:
    counting a prescribed time period repeatedly; and
    transmitting the discard number information packet if the counting of the prescribed time period has been completed, even if the discard number is less than the threshold.

4. The packet relay apparatus according to claim 1, further comprising a control circuit that executes generating the discard number information packet for a flow at a constant period, and inputting it to the first packet processing circuit:
    wherein the first packet processing circuit executes, after updating the discard number notified by the discard number information packet by adding a discard number counted by the first packet processing circuit for the flow, transferring the discard number information packet to the second packet processing circuit.

5. The packet relay apparatus according to claim 4, wherein the first packet processing circuit is connected in multi-stage, and the control circuit inputs the discard number information packet to the front-most stage among the first packet processing circuit connected in multi-stage.

6. The packet relay apparatus according to claim 1, further comprising a control circuit that executes: receiving command for generating the discard number information packet and generating, if the command is received, the discard number information packet and inputting it to the first packet processing circuit;
wherein the first packet processing circuit executes, after updating the discard number notified by the discard number information packet by adding a discard number counted by the first packet processing circuit for a flow, transferring the discard number information packet to the second packet processing circuit.

7. The packet relay apparatus according to claim 1, wherein the data packets are unicast packets.

8. The packet relay apparatus according to claim 1, further comprising a packet replication circuit between the first packet processing circuit and the second packet processing circuit, wherein, if the data packets are multicast packets, the first packet processing circuit executes:
counting discard number of the multicast packets by multicast group of the multicast packets;
determining whether or not the discard number is equal to or greater than a threshold; and
transferring, if the discard number is equal to or greater than a threshold, a discard number information packet notifying the discard number by the multicast group to the packet replication circuit; and
wherein the packet replication circuit executes: replicating the discard number information packet transferred by the multicast group in number of destinations of the multicast packet, and transferring them respectively to the second packet processing circuit.

9. A measurement method for measuring discard number of data packets by a packet relay apparatus, the packet relay apparatus comprising a first packet processing circuit and a second packet processing circuit,
wherein the measurement method causes the first packet processing circuit to execute:
discarding of some data packets, from among the data packets, and transferring the rest of the data packets to the second packet processing circuit;
counting discard number of the data packets;
determining whether or not the discard number is equal to or greater than a threshold; and
transferring, if the discard number is equal to or greater than the threshold, a discard number information packet including discard number information indicating the discard number to the second packet processing circuit;
and the measurement method causes the second packet processing circuit to execute:
discarding some data packets from among the data packets;
counting discard number of the data packets; and
collecting the discard number counted by the second packet processing circuit and the discard number indicated by the discard number information included in the discard number information packet, wherein the first packet processing circuit does not discard the discard number information packet that is a packet which includes discard number information indicating the discard number and is generated separately from the data packet, but transfers it to the second packet processing circuit, and
the measurement method further causes the first packet processing circuit to execute with a storage unit of the packet relay apparatus that stores a queue for accumulating the data packet and the discard number information packet:
detecting queue length of the queue;
discarding, if the queue length is longer than a first threshold, the data packet other than the discard number information packet;
accumulating, if the queue length is shorter than a second threshold that is longer than the first threshold, the discard number information packet in the queue; and
transferring packets accumulated in the queue to the second packet processing circuit.

* * * * *